US008761355B2

(12) United States Patent
Reding et al.

(10) Patent No.: US 8,761,355 B2
(45) Date of Patent: Jun. 24, 2014

(54) METHODS AND SYSTEMS FOR NOTIFICATION OF CALL TO DEVICE

(75) Inventors: Craig L. Reding, Midland Park, NJ (US); Ziauddin Majid, Irving, TX (US); Shashi Neelakantan, Irving, TX (US)

(73) Assignees: Telesector Resources Group, Inc., New York, NY (US); Verizon Data Services LLC, Temple Terrace, FL (US)

( * ) Notice: Subject to any disclaimer, the term of this patent is extended or adjusted under 35 U.S.C. 154(b) by 1132 days.

(21) Appl. No.: 10/720,920

(22) Filed: Nov. 24, 2003

(65) Prior Publication Data
US 2004/0264654 A1 Dec. 30, 2004

Related U.S. Application Data

(60) Provisional application No. 60/436,018, filed on Dec. 26, 2002, provisional application No. 60/428,704, filed on Nov. 25, 2002.

(51) Int. Cl.
*H04M 1/64* (2006.01)
(52) U.S. Cl.
USPC .......... 379/88.12; 379/88.11; 379/88.13; 379/88.17; 379/211.01; 455/412.1; 455/412.2; 709/201
(58) Field of Classification Search
USPC ........ 379/88.11, 88.12, 88.13, 88.17, 211.01; 455/412.1, 412.2; 709/201
See application file for complete search history.

(56) References Cited

U.S. PATENT DOCUMENTS

| 4,013,839 | A |   | 3/1977  | Bell              |           |
|-----------|---|---|---------|-------------------|-----------|
| 4,540,850 | A |   | 9/1985  | Herr et al.       | 379/88.19 |
| 4,600,814 | A |   | 7/1986  | Cunniff et al.    |           |
| 4,734,931 | A |   | 3/1988  | Bourg et al.      |           |
| 4,924,496 | A |   | 5/1990  | Figa et al.       |           |
| 5,014,303 | A |   | 5/1991  | Velius            |           |
| 5,113,431 | A |   | 5/1992  | Horn              |           |
| 5,168,515 | A |   | 12/1992 | Gechter et al.    |           |
| 5,222,125 | A | * | 6/1993  | Creswell et al.   | 379/114.05|
| 5,274,700 | A | * | 12/1993 | Gechter et al.    | 379/211.01|
| 5,327,486 | A | * | 7/1994  | Wolff et al.      | 379/93.23 |
| 5,329,578 | A | * | 7/1994  | Brennan et al.    | 379/211.03|
| 5,428,663 | A | * | 6/1995  | Grimes et al.     | 340/7.21  |
| 5,440,624 | A |   | 8/1995  | Schoof            |           |
| 5,483,586 | A |   | 1/1996  | Sussman           |           |

(Continued)

FOREIGN PATENT DOCUMENTS

CA    2240878    12/1998
DE    10110942    9/2002

(Continued)

OTHER PUBLICATIONS

"MP3 Recorder Download—MP3 Recorder—Record Audio Stream to MP3 or WAV," 2002 http://www.mp3-recorder.net.

(Continued)

*Primary Examiner* — Hemant Patel

(57) ABSTRACT

Methods and systems for providing a call notification, voice mail message notification, or SMS message for a wireless device to a user's preferred device. When a wireless device receives an incoming call, a voice mail message, or a SMS message, the wireless device connects to a network and sends a notification to the user's preferred device. If the preferred device is not available, the notification is stored in a database.

14 Claims, 7 Drawing Sheets

(56) References Cited

U.S. PATENT DOCUMENTS

| | | | |
|---|---|---|---|
| 5,533,096 A * | 7/1996 | Bales | 455/560 |
| 5,535,265 A | 7/1996 | Suwandhaputra | |
| 5,546,449 A | 8/1996 | Hogan et al. | |
| 5,548,636 A | 8/1996 | Bannister et al. | |
| 5,550,907 A | 8/1996 | Carlsen | |
| 5,583,564 A | 12/1996 | Rao et al. | |
| 5,586,173 A * | 12/1996 | Misholi et al. | 379/88.13 |
| 5,588,037 A * | 12/1996 | Fuller et al. | 379/211.02 |
| 5,608,788 A | 3/1997 | Demlow et al. | |
| 5,619,555 A | 4/1997 | Fenton et al. | |
| 5,621,787 A | 4/1997 | McKoy et al. | |
| 5,623,541 A | 4/1997 | Boyle et al. | |
| 5,631,904 A * | 5/1997 | Fitser et al. | 370/261 |
| 5,638,434 A | 6/1997 | Gottlieb et al. | |
| 5,649,105 A | 7/1997 | Aldred et al. | |
| 5,652,789 A * | 7/1997 | Miner et al. | 379/201.01 |
| 5,661,788 A | 8/1997 | Chin | |
| 5,668,863 A | 9/1997 | Bieselin et al. | |
| 5,673,080 A | 9/1997 | Biggs et al. | |
| 5,692,213 A | 11/1997 | Goldberg et al. | |
| 5,710,591 A | 1/1998 | Bruno et al. | |
| 5,712,903 A | 1/1998 | Bartholomew et al. | |
| 5,715,444 A | 2/1998 | Danish et al. | |
| 5,717,863 A | 2/1998 | Adamson et al. | |
| 5,719,925 A | 2/1998 | Peoples | |
| 5,724,412 A | 3/1998 | Srinivasan | |
| 5,742,095 A * | 4/1998 | Bryant et al. | 257/647 |
| 5,742,668 A | 4/1998 | Pepe et al. | |
| 5,742,905 A | 4/1998 | Pepe et al. | |
| 5,745,561 A * | 4/1998 | Baker et al. | 379/211.01 |
| 5,745,884 A | 4/1998 | Carnegie et al. | |
| 5,747,970 A | 5/1998 | Johnson, Jr. et al. | |
| 5,751,800 A * | 5/1998 | Ardon | 379/134 |
| 5,752,191 A | 5/1998 | Fuller et al. | |
| 5,764,901 A | 6/1998 | Skarbo et al. | |
| 5,805,670 A * | 9/1998 | Pons et al. | 379/45 |
| 5,841,837 A * | 11/1998 | Fuller et al. | 340/825.49 |
| 5,864,603 A | 1/1999 | Haavisto et al. | |
| 5,872,841 A | 2/1999 | King et al. | |
| 5,875,242 A | 2/1999 | Glaser et al. | 379/207 |
| 5,875,437 A | 2/1999 | Atkins | |
| 5,892,900 A | 4/1999 | Ginter et al. | |
| 5,903,845 A | 5/1999 | Buhrmann et al. | 455/461 |
| 5,907,324 A | 5/1999 | Larson et al. | |
| 5,907,547 A | 5/1999 | Foladare et al. | 370/352 |
| 5,910,987 A | 6/1999 | Ginter et al. | |
| 5,916,302 A | 6/1999 | Dunn et al. | |
| 5,917,817 A | 6/1999 | Dunn et al. | |
| 5,917,912 A | 6/1999 | Ginter et al. | |
| 5,920,826 A | 7/1999 | Metso et al. | |
| 5,920,847 A | 7/1999 | Kolling et al. | |
| 5,926,535 A * | 7/1999 | Reynolds | 379/221.06 |
| 5,944,769 A | 8/1999 | Musk et al. | |
| 5,945,989 A | 8/1999 | Freishtat et al. | |
| 5,960,342 A | 9/1999 | Liem et al. | |
| 5,963,925 A | 10/1999 | Kolling et al. | |
| 5,982,870 A * | 11/1999 | Pershan et al. | 379/211.08 |
| 6,005,870 A * | 12/1999 | Leung et al. | 370/466 |
| 6,011,579 A | 1/2000 | Newlin | |
| 6,018,571 A | 1/2000 | Langlois et al. | |
| 6,018,737 A | 1/2000 | Shah et al. | |
| 6,021,428 A | 2/2000 | Miloslavsky | |
| 6,029,151 A | 2/2000 | Nikander | |
| 6,031,896 A * | 2/2000 | Gardell et al. | 379/88.17 |
| 6,041,103 A | 3/2000 | La Porta et al. | |
| 6,052,372 A | 4/2000 | Gittins et al. | |
| 6,058,163 A * | 5/2000 | Pattison et al. | 379/265.06 |
| 6,061,432 A | 5/2000 | Wallace et al. | |
| 6,078,658 A | 6/2000 | Yunoki | |
| 6,088,435 A | 7/2000 | Barber et al. | |
| 6,092,102 A * | 7/2000 | Wagner | 340/7.29 |
| 6,100,882 A | 8/2000 | Sharman et al. | |
| 6,122,348 A | 9/2000 | French-St. George et al. | |
| 6,134,318 A * | 10/2000 | O'Neil | 379/266.01 |
| 6,134,548 A | 10/2000 | Gottsman et al. | |
| 6,144,671 A * | 11/2000 | Perinpanathan et al. | 370/409 |
| 6,145,096 A | 11/2000 | Bereiter et al. | |
| 6,154,646 A * | 11/2000 | Tran et al. | 455/417 |
| 6,161,008 A * | 12/2000 | Lee et al. | 455/415 |
| 6,163,692 A | 12/2000 | Chakrabarti et al. | |
| 6,167,119 A | 12/2000 | Bartholomew et al. | |
| 6,188,756 B1 | 2/2001 | Mashinsky | |
| 6,189,026 B1 | 2/2001 | Birrell et al. | |
| 6,192,123 B1 | 2/2001 | Grunsted et al. | 379/350 |
| 6,195,660 B1 | 2/2001 | Polnerow et al. | |
| 6,215,863 B1 | 4/2001 | Bennett et al. | |
| 6,219,413 B1 | 4/2001 | Burg | 379/215.01 |
| 6,226,374 B1 | 5/2001 | Howell et al. | 379/207 |
| 6,240,449 B1 | 5/2001 | Nadeau | |
| 6,243,366 B1 | 6/2001 | Bradley et al. | |
| 6,260,050 B1 | 7/2001 | Yost et al. | |
| 6,275,575 B1 | 8/2001 | Wu | |
| 6,282,522 B1 | 8/2001 | Davis et al. | |
| 6,296,062 B1 | 10/2001 | Sundholm | |
| 6,298,129 B1 | 10/2001 | Culver et al. | |
| 6,301,338 B1 | 10/2001 | Makela et al. | |
| 6,301,609 B1 * | 10/2001 | Aravamudan et al. | 709/207 |
| 6,310,939 B1 | 10/2001 | Varney | |
| 6,310,947 B1 | 10/2001 | Polcyn | 379/211.01 |
| 6,324,269 B1 | 11/2001 | Malik | |
| 6,330,321 B2 | 12/2001 | Detampel et al. | |
| 6,333,973 B1 | 12/2001 | Smith et al. | |
| 6,349,299 B1 | 2/2002 | Spencer et al. | |
| 6,351,279 B1 | 2/2002 | Sawyer | |
| 6,363,143 B1 * | 3/2002 | Fox | 379/211.01 |
| 6,371,484 B1 | 4/2002 | Yuan | |
| 6,373,817 B1 | 4/2002 | Kung et al. | |
| 6,373,930 B1 | 4/2002 | McConnell et al. | |
| 6,385,754 B1 | 5/2002 | Mizumoto et al. | |
| 6,389,113 B1 * | 5/2002 | Silverman | 379/35 |
| 6,404,873 B1 | 6/2002 | Beyda et al. | |
| 6,408,191 B1 * | 6/2002 | Blanchard et al. | 455/566 |
| 6,408,327 B1 | 6/2002 | McClennon et al. | |
| 6,411,605 B1 | 6/2002 | Vance et al. | |
| 6,418,214 B1 | 7/2002 | Smythe et al. | |
| 6,430,176 B1 | 8/2002 | Christie | |
| 6,430,289 B1 | 8/2002 | Liffick | 379/900 |
| 6,434,226 B1 | 8/2002 | Takahashi | |
| 6,442,245 B1 | 8/2002 | Castagna et al. | |
| 6,442,251 B1 | 8/2002 | Maes et al. | |
| 6,442,748 B1 | 8/2002 | Bowman-Amuah | |
| 6,453,031 B2 | 9/2002 | Malik | |
| 6,453,167 B1 | 9/2002 | Michaels et al. | |
| 6,459,780 B1 | 10/2002 | Wurster et al. | 379/142.02 |
| 6,459,913 B2 | 10/2002 | Cloutier | |
| 6,463,145 B1 | 10/2002 | O'Neal et al. | 379/211.02 |
| 6,463,464 B1 * | 10/2002 | Lazaridis et al. | 709/207 |
| 6,466,910 B1 | 10/2002 | Desmond et al. | |
| 6,470,079 B1 | 10/2002 | Benson | |
| 6,473,615 B1 | 10/2002 | Theppasandra et al. | |
| 6,477,374 B1 | 11/2002 | Shaffer et al. | 455/445 |
| 6,480,830 B1 | 11/2002 | Ford et al. | |
| 6,480,890 B1 | 11/2002 | Lee, Jr. et al. | |
| 6,507,644 B1 | 1/2003 | Henderson et al. | |
| 6,519,326 B1 | 2/2003 | Milewski et al. | |
| 6,522,734 B1 | 2/2003 | Allen et al. | |
| 6,526,134 B1 | 2/2003 | Wallenius | |
| 6,532,285 B1 | 3/2003 | Tucker et al. | |
| 6,535,596 B1 | 3/2003 | Frey et al. | |
| 6,539,082 B1 | 3/2003 | Lowe et al. | |
| 6,542,596 B1 | 4/2003 | Hill et al. | |
| 6,546,005 B1 | 4/2003 | Berkley et al. | 370/353 |
| 6,546,262 B1 | 4/2003 | Freadman | |
| 6,547,830 B1 | 4/2003 | Mercer | |
| 6,560,329 B1 | 5/2003 | Draginich et al. | |
| 6,563,914 B2 | 5/2003 | Sammon et al. | |
| 6,564,261 B1 | 5/2003 | Gudjonsson et al. | 709/227 |
| 6,574,324 B1 | 6/2003 | Malik | |
| 6,574,470 B1 | 6/2003 | Chow et al. | |
| 6,577,622 B1 | 6/2003 | Schuster et al. | 370/352 |
| 6,577,720 B1 | 6/2003 | Sutter | |
| 6,584,122 B1 | 6/2003 | Matthews et al. | 370/493 |
| 6,587,890 B1 | 7/2003 | Kult et al. | |
| 6,590,603 B2 | 7/2003 | Sheldon et al. | |

(56) References Cited

U.S. PATENT DOCUMENTS

| | | | |
|---|---|---|---|
| 6,590,969 B1 | 7/2003 | Peters et al. | |
| 6,593,352 B2 | 7/2003 | Weichert et al. | |
| 6,594,470 B1 | 7/2003 | Barnes et al. | |
| 6,600,736 B1 | 7/2003 | Ball et al. | |
| 6,609,113 B1 | 8/2003 | O'Leary | |
| 6,611,590 B1 | 8/2003 | Lu et al. | |
| 6,614,786 B1 | 9/2003 | Byers | 370/353 |
| 6,618,710 B1 | 9/2003 | Zondervan et al. | |
| 6,625,258 B1 | 9/2003 | Ram et al. | |
| 6,628,194 B1 | 9/2003 | Hellebust et al. | |
| 6,628,770 B1 | 9/2003 | Jain et al. | |
| 6,631,186 B1 | 10/2003 | Adams et al. | |
| 6,636,587 B1 | 10/2003 | Nagai et al. | |
| 6,643,356 B1 * | 11/2003 | Hickey et al. | 379/88.12 |
| 6,654,768 B2 | 11/2003 | Celik | |
| 6,661,340 B1 * | 12/2003 | Saylor et al. | 340/517 |
| 6,665,388 B2 * | 12/2003 | Bedingfield | 379/142.01 |
| 6,668,046 B1 | 12/2003 | Albal | |
| 6,668,049 B1 | 12/2003 | Koch et al. | |
| 6,681,119 B1 | 1/2004 | Verdonk | |
| 6,683,939 B1 | 1/2004 | Chiloyan et al. | |
| 6,687,362 B1 | 2/2004 | Lindquist et al. | |
| 6,690,672 B1 | 2/2004 | Klein | |
| 6,693,897 B1 | 2/2004 | Huang | |
| 6,694,351 B1 | 2/2004 | Shaffer et al. | |
| 6,697,461 B1 | 2/2004 | Middleswarth et al. | |
| 6,697,796 B2 | 2/2004 | Kermani | |
| 6,704,294 B1 | 3/2004 | Cruickshank | |
| 6,711,158 B1 | 3/2004 | Kahane et al. | |
| 6,717,938 B1 | 4/2004 | D'Angelo | |
| 6,718,026 B1 | 4/2004 | Pershan et al. | |
| 6,718,178 B1 * | 4/2004 | Sladek et al. | 455/466 |
| 6,724,887 B1 | 4/2004 | Eilbacher et al. | |
| 6,731,238 B2 | 5/2004 | Johnson | |
| 6,735,292 B1 | 5/2004 | Johnson | |
| 6,738,458 B1 | 5/2004 | Cline et al. | |
| 6,744,861 B1 | 6/2004 | Pershan et al. | |
| 6,747,970 B1 | 6/2004 | Lamb et al. | |
| 6,748,054 B1 | 6/2004 | Gross et al. | |
| 6,754,227 B1 | 6/2004 | Petersen et al. | |
| 6,757,365 B1 | 6/2004 | Bogard | |
| 6,768,788 B1 | 7/2004 | Langseth et al. | |
| 6,768,790 B1 | 7/2004 | Manduley et al. | |
| 6,771,949 B1 | 8/2004 | Corliss | |
| 6,772,436 B1 | 8/2004 | Doganata et al. | |
| 6,775,267 B1 | 8/2004 | Kung et al. | |
| 6,775,546 B1 * | 8/2004 | Fuller | 455/445 |
| 6,788,772 B2 | 9/2004 | Barak et al. | |
| 6,788,775 B1 | 9/2004 | Simpson | |
| 6,792,092 B1 | 9/2004 | Michalewicz | |
| 6,798,753 B1 | 9/2004 | Doganata et al. | |
| 6,801,610 B1 | 10/2004 | Malik | |
| 6,807,258 B1 | 10/2004 | Malik | |
| 6,807,259 B1 | 10/2004 | Patel et al. | |
| 6,816,468 B1 | 11/2004 | Cruickshank | |
| 6,816,469 B1 | 11/2004 | Kung et al. | |
| 6,820,055 B2 | 11/2004 | Saindon et al. | |
| 6,839,417 B2 | 1/2005 | Weisman et al. | |
| 6,842,460 B1 | 1/2005 | Olkkonen et al. | |
| 6,847,823 B2 | 1/2005 | Lehikoinen et al. | |
| 6,853,634 B1 | 2/2005 | Davies et al. | |
| 6,853,713 B1 | 2/2005 | Fobert et al. | |
| 6,856,974 B1 | 2/2005 | Ganesan et al. | |
| 6,870,916 B2 | 3/2005 | Henrikson et al. | |
| 6,876,632 B1 | 4/2005 | Takeda | |
| 6,876,736 B2 * | 4/2005 | Lamy et al. | 379/211.01 |
| 6,882,714 B2 | 4/2005 | Mansfield | |
| 6,882,838 B1 * | 4/2005 | Lee et al. | 455/417 |
| 6,885,742 B1 * | 4/2005 | Smith | 379/211.01 |
| 6,907,111 B1 | 6/2005 | Zhang et al. | |
| 6,917,610 B1 | 7/2005 | Kung et al. | |
| 6,937,713 B1 | 8/2005 | Kung et al. | |
| 6,944,279 B2 | 9/2005 | Elsey et al. | |
| 6,947,538 B2 | 9/2005 | Shen et al. | |
| 6,954,521 B2 | 10/2005 | Bull et al. | |
| 6,954,524 B2 | 10/2005 | Gibson | |
| 6,956,942 B2 | 10/2005 | McKinzie et al. | |
| 6,958,984 B2 | 10/2005 | Kotzin | |
| 6,961,409 B2 * | 11/2005 | Kato | 379/88.13 |
| 6,963,857 B1 | 11/2005 | Johnson | |
| 6,970,705 B2 | 11/2005 | Yoshimoto et al. | |
| 6,988,132 B2 | 1/2006 | Horvitz | |
| 6,996,227 B2 | 2/2006 | Albal et al. | |
| 6,996,370 B2 * | 2/2006 | De Loye et al. | 455/41.2 |
| 6,999,563 B1 | 2/2006 | Thorpe et al. | |
| 7,024,209 B1 | 4/2006 | Gress et al. | |
| 7,027,435 B2 * | 4/2006 | Bardehle | 370/352 |
| 7,031,437 B1 * | 4/2006 | Parsons et al. | 379/88.12 |
| 7,043,521 B2 | 5/2006 | Eitel | |
| 7,065,198 B2 | 6/2006 | Brown et al. | |
| 7,068,768 B2 | 6/2006 | Barnes | |
| 7,069,298 B2 | 6/2006 | Zhu et al. | |
| 7,076,528 B2 * | 7/2006 | Premutico | 709/206 |
| 7,099,288 B1 | 8/2006 | Parker et al. | |
| 7,102,643 B2 | 9/2006 | Moore et al. | |
| 7,107,312 B2 | 9/2006 | Hackbarth et al. | |
| 7,116,972 B1 * | 10/2006 | Zhang et al. | 455/414.1 |
| 7,127,050 B2 | 10/2006 | Walsh et al. | |
| 7,130,390 B2 | 10/2006 | Abburi | |
| 7,136,461 B1 | 11/2006 | Swingle et al. | |
| 7,139,728 B2 | 11/2006 | Rigole | |
| 7,139,782 B2 | 11/2006 | Osaki | |
| 7,142,646 B2 | 11/2006 | Zafar et al. | |
| 7,149,773 B2 | 12/2006 | Haller et al. | |
| 7,155,001 B2 | 12/2006 | Tiliks et al. | |
| 7,167,552 B1 | 1/2007 | Shaffer et al. | |
| 7,174,306 B1 * | 2/2007 | Haseltine | 705/26 |
| 7,181,417 B1 | 2/2007 | Langseth et al. | |
| 7,187,932 B1 | 3/2007 | Barchi | |
| 7,190,773 B1 | 3/2007 | D'Silva et al. | |
| 7,209,955 B1 | 4/2007 | Major et al. | |
| 7,212,808 B2 * | 5/2007 | Engstrom et al. | 455/412.1 |
| 7,245,929 B2 | 7/2007 | Henderson et al. | |
| 7,254,220 B1 | 8/2007 | Reding et al. | |
| 7,254,643 B1 | 8/2007 | Peters et al. | |
| 7,283,808 B2 * | 10/2007 | Castell et al. | 455/413 |
| 7,289,489 B1 | 10/2007 | Kung et al. | |
| 7,308,087 B2 | 12/2007 | Joyce et al. | |
| 7,315,614 B2 * | 1/2008 | Bedingfield et al. | 379/142.07 |
| 7,353,258 B2 | 4/2008 | Washburn | |
| 7,379,538 B1 * | 5/2008 | Ali et al. | 379/88.12 |
| 7,418,090 B2 | 8/2008 | Reding et al. | |
| 7,420,935 B2 | 9/2008 | Virolainen | |
| 7,428,580 B2 | 9/2008 | Hullfish et al. | |
| 7,546,337 B1 | 6/2009 | Crawford | |
| 7,561,872 B1 | 7/2009 | Koch et al. | |
| 7,606,909 B1 | 10/2009 | Ely et al. | |
| 7,616,747 B2 | 11/2009 | Wurster et al. | |
| 7,912,193 B2 | 3/2011 | Chingon et al. | |
| 8,166,173 B2 | 4/2012 | Low et al. | |
| 8,238,380 B2 | 8/2012 | D'Angelo | |
| 8,271,591 B2 | 9/2012 | Malik et al. | |
| 8,467,502 B2 | 6/2013 | Sureka et al. | |
| 2001/0003202 A1 | 6/2001 | Mache et al. | |
| 2001/0012286 A1 | 8/2001 | Huna et al. | |
| 2001/0014863 A1 | 8/2001 | Williams, III | |
| 2001/0017777 A1 | 8/2001 | Maruyama et al. | |
| 2001/0025262 A1 | 9/2001 | Ahmed | |
| 2001/0025280 A1 | 9/2001 | Mandato et al. | |
| 2001/0032181 A1 | 10/2001 | Jakstadt et al. | |
| 2001/0039191 A1 | 11/2001 | Maierhofer | |
| 2001/0040954 A1 | 11/2001 | Brachman et al. | |
| 2001/0043689 A1 | 11/2001 | Malik | |
| 2001/0043690 A1 | 11/2001 | Bakshi et al. | |
| 2001/0043691 A1 | 11/2001 | Bull et al. | |
| 2001/0051534 A1 | 12/2001 | Amin | |
| 2001/0051919 A1 | 12/2001 | Mason | |
| 2001/0054066 A1 | 12/2001 | Spitzer | |
| 2001/0056466 A1 | 12/2001 | Thompson et al. | |
| 2002/0012425 A1 | 1/2002 | Brisebois et al. | |
| 2002/0018550 A1 * | 2/2002 | Hafez | 379/211.01 |
| 2002/0022453 A1 | 2/2002 | Balog et al. | |
| 2002/0026575 A1 | 2/2002 | Wheeler et al. | |
| 2002/0035617 A1 | 3/2002 | Lynch et al. | |

(56) References Cited

U.S. PATENT DOCUMENTS

| | | |
|---|---|---|
| 2002/0040355 A1 | 4/2002 | Weiner |
| 2002/0046299 A1* | 4/2002 | Lefeber et al. ............... 709/318 |
| 2002/0055351 A1 | 5/2002 | Elsey et al. |
| 2002/0057678 A1 | 5/2002 | Jiang et al. |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |
| 2002/0071539 A1* | 6/2002 | Diament et al. ......... 379/202.01 |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076022 A1 | 6/2002 | Bedingfield |
| 2002/0076025 A1 | 6/2002 | Liversidge et al. |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper .................. 379/201.01 |
| 2002/0082028 A1* | 6/2002 | Wittenkamp ................ 455/458 |
| 2002/0082030 A1 | 6/2002 | Berndt et al. |
| 2002/0082997 A1 | 6/2002 | Kobata et al. |
| 2002/0083462 A1 | 6/2002 | Arnott ...................... 348/14.08 |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0087469 A1 | 7/2002 | Ganesan et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra ....................... 370/389 |
| 2002/0115471 A1* | 8/2002 | De Loye et al. .............. 455/552 |
| 2002/0122545 A1 | 9/2002 | Schwab et al. |
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1* | 9/2002 | Karve ........................... 455/466 |
| 2002/0138468 A1 | 9/2002 | Kermani |
| 2002/0146105 A1 | 10/2002 | McIntyre |
| 2002/0147777 A1* | 10/2002 | Hackbarth et al. ........... 709/205 |
| 2002/0147811 A1* | 10/2002 | Schwartz et al. ............ 709/225 |
| 2002/0152165 A1 | 10/2002 | Dutta et al. |
| 2002/0154210 A1 | 10/2002 | Ludwig et al. |
| 2002/0168055 A1 | 11/2002 | Crockett et al. |
| 2002/0177410 A1* | 11/2002 | Klein et al. ..................... 455/41 |
| 2002/0178117 A1 | 11/2002 | Maguire et al. |
| 2003/0005150 A1 | 1/2003 | Thompson et al. |
| 2003/0014488 A1 | 1/2003 | Dalal et al. |
| 2003/0035381 A1 | 2/2003 | Chen et al. |
| 2003/0036380 A1* | 2/2003 | Skidmore ..................... 455/414 |
| 2003/0045309 A1 | 3/2003 | Knotts |
| 2003/0046071 A1 | 3/2003 | Wyman et al. |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz ................. 370/352 |
| 2003/0063732 A1 | 4/2003 | Mcknight et al. |
| 2003/0069874 A1* | 4/2003 | Hertzog et al. .................... 707/1 |
| 2003/0083040 A1 | 5/2003 | Ruth et al. |
| 2003/0092451 A1* | 5/2003 | Holloway et al. ............ 455/461 |
| 2003/0093700 A1 | 5/2003 | Yoshimoto et al. |
| 2003/0096626 A1* | 5/2003 | Sabo et al. .................... 455/466 |
| 2003/0097635 A1 | 5/2003 | Giannetti |
| 2003/0104827 A1* | 6/2003 | Moran et al. .................. 455/466 |
| 2003/0108172 A1 | 6/2003 | Petty et al. |
| 2003/0112928 A1 | 6/2003 | Brown et al. |
| 2003/0112952 A1 | 6/2003 | Brown et al. |
| 2003/0119532 A1 | 6/2003 | Hatch |
| 2003/0140004 A1 | 7/2003 | O'Leary et al. |
| 2003/0142798 A1* | 7/2003 | Gavette et al. .............. 379/88.12 |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0167229 A1 | 9/2003 | Ludwig et al. |
| 2003/0169330 A1 | 9/2003 | Ben-Shachar et al. |
| 2003/0179743 A1 | 9/2003 | Bosik et al. |
| 2003/0179864 A1 | 9/2003 | Stillman et al. |
| 2003/0187992 A1 | 10/2003 | Steenfeldt et al. |
| 2003/0208541 A1 | 11/2003 | Musa |
| 2003/0217097 A1 | 11/2003 | Eitel |
| 2003/0228863 A1* | 12/2003 | Vander Veen et al. ...... 455/412.1 |
| 2004/0002350 A1 | 1/2004 | Gopinath et al. |
| 2004/0002902 A1 | 1/2004 | Muehlhaeuser |
| 2004/0019638 A1 | 1/2004 | Makagon et al. ............. 709/204 |
| 2004/0034700 A1 | 2/2004 | Polcyn |
| 2004/0037409 A1 | 2/2004 | Crockett et al. |
| 2004/0044658 A1 | 3/2004 | Crabtree et al. |
| 2004/0052356 A1 | 3/2004 | McKinzie et al. |
| 2004/0081292 A1 | 4/2004 | Brown et al. |
| 2004/0103152 A1 | 5/2004 | Ludwig et al. |
| 2004/0119814 A1 | 6/2004 | Clisham et al. |
| 2004/0127256 A1 | 7/2004 | Goldthwaite et al. |
| 2004/0156491 A1* | 8/2004 | Reding et al. ............. 379/201.02 |
| 2004/0184593 A1 | 9/2004 | Elsey et al. |
| 2004/0203942 A1 | 10/2004 | Dehlin |
| 2004/0208305 A1 | 10/2004 | Gross et al. |
| 2004/0236792 A1* | 11/2004 | Celik .......................... 707/104.1 |
| 2004/0247088 A1 | 12/2004 | Lee |
| 2004/0249884 A1 | 12/2004 | Caspi et al. |
| 2004/0264654 A1* | 12/2004 | Reding et al. .............. 379/88.12 |
| 2005/0053206 A1 | 3/2005 | Chingon et al. |
| 2005/0053221 A1* | 3/2005 | Reding et al. ............. 379/211.02 |
| 2005/0102382 A1 | 5/2005 | MacGregor et al. |
| 2005/0117714 A1 | 6/2005 | Chingon et al. |
| 2005/0129208 A1 | 6/2005 | McGrath et al. |
| 2005/0149487 A1 | 7/2005 | Celik |
| 2005/0191994 A1 | 9/2005 | May et al. |
| 2005/0216421 A1 | 9/2005 | Barry et al. |
| 2005/0220286 A1 | 10/2005 | Valdez et al. |
| 2005/0243993 A1 | 11/2005 | McKinzie et al. |
| 2006/0093120 A1 | 5/2006 | Thorpe et al. |
| 2006/0095575 A1 | 5/2006 | Sureka et al. |
| 2006/0168140 A1 | 7/2006 | Inoue et al. |
| 2006/0276179 A1 | 12/2006 | Ghaffari et al. |
| 2006/0277213 A1 | 12/2006 | Robertson et al. |
| 2007/0021111 A1* | 1/2007 | Celik ............................ 455/418 |
| 2009/0060155 A1 | 3/2009 | Chingon et al. |

FOREIGN PATENT DOCUMENTS

| | | |
|---|---|---|
| EP | 0818908 | 1/1998 |
| EP | 0818908 A3 | 1/1998 |
| EP | 1014630 | 6/2000 |
| EP | 1017210 | 7/2000 |
| EP | 1028578 | 8/2000 |
| EP | 1161063 | 12/2001 |
| EP | 1193617 | 4/2002 |
| EP | 1235387 | 8/2002 |
| EP | 1294201 | 3/2003 |
| JP | 59-169264 | 9/1984 |
| JP | 02-260750 | 10/1990 |
| JP | 04-336742 | 11/1992 |
| JP | 05-316233 | 11/1993 |
| JP | 6-113020 | 4/1994 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |
| JP | 08-149226 | 6/1996 |
| JP | 08-181763 | 7/1996 |
| JP | 08-298546 | 11/1996 |
| JP | 8-331642 | 12/1996 |
| JP | 9-64869 | 3/1997 |
| JP | 09-064977 | 3/1997 |
| JP | 09-083651 | 3/1997 |
| JP | 09-200350 | 7/1997 |
| JP | 09-223087 | 8/1997 |
| JP | 9-261759 | 10/1997 |
| JP | 09-294158 | 11/1997 |
| JP | 09-294163 | 11/1997 |
| JP | 10-013546 | 1/1998 |

(56) References Cited

FOREIGN PATENT DOCUMENTS

| | | |
|---|---|---|
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000-224301 | 8/2000 |
| JP | 2000-270307 | 9/2000 |
| JP | 2000-349902 | 12/2000 |
| JP | 2001-144859 | 5/2001 |
| JP | 2001-156921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-16673 | 1/2002 |
| JP | 2002-41522 | 2/2002 |
| JP | 2002-044123 | 2/2002 |
| JP | 2002-044257 | 2/2002 |
| JP | 2002-057807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300290 | 10/2002 |
| JP | 2002-300306 | 10/2002 |
| WO | WO-95/12948 | 5/1995 |
| WO | 96/14704 | 5/1996 |
| WO | WO-97/20423 | 6/1997 |
| WO | WO-97/33421 | 9/1997 |
| WO | WO-98/02007 | 1/1998 |
| WO | WO-99/22493 | 5/1999 |
| WO | 99/38309 | 7/1999 |
| WO | 00/45557 | 8/2000 |
| WO | 00/64133 | 10/2000 |
| WO | WO-00/60837 | 10/2000 |
| WO | WO01/11586 | 2/2001 |
| WO | WO 01/11586 A1 | 2/2001 |
| WO | WO-01/22751 | 3/2001 |
| WO | WO 01/35621 | 5/2001 |
| WO | 01/52513 | 7/2001 |
| WO | WO 01/89212 | 11/2001 |
| WO | WO-02/25907 | 3/2002 |
| WO | WO-02/43338 | 5/2002 |

OTHER PUBLICATIONS

"FAQ Premium Home Answer" eVoice, http://content.evoice.com/wcs/signUp/FAQ_premHA_s01.htm.
"Audio Digitizing Process," TalkBank, http://www.talkbank.org/da/audiodig.html.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Macromedia SoundEdit 16 Support Center-Working with Other Programs, What is Shockwave Audio Streaming?" http://www.macromedia.com/support/soundedit/how/shock/whatis.html.
"How Internet Radio Works," Howstuffworks, http://computer.howstuffworks.com/internet-radio.htm/printable.
"Telecommunications and Personal Management Services Linked in Collaboration by Verizon and Microsoft," Oct. 23, 2001, http://www.micrsoft.com/presspass/press/2001/oct01/10-23MSVerizonPr.asp.
"Real-Time Collaboration Integration in the Portal," T. Odenwald, SAP Design Guild, http://www.sapdesignguild.org/editions/edition5/synch_collab.asp.
"NetMeeting101," http://www.mettingbywire.com/NetMeeting101.htm.
"NetMeeting102," http://www.meetingbywire.com/NetMeeting102.htm.
"Instructions on Application Sharing and Data Collaboration," VCON Escort and Cruiser, http://www.vide.gatech.edu/docs/share/.
"Instructions on Multipoint Application Sharing and Data Collaboration," VCON Escort and Cruiser with the RadVision MCU, http://www.vide.gatech.edu/docs/multi-share/.
"MediaTone—The 'Dial Tone' for Web Communications Services," Webex, 2003.
Business Solutions/Professional, http://www.accessline.com/business_sol/bs_professional_body.html.
"InteleScreener," 2003, http://www.intelescreener.com/howitworks.html.
"TeleZapper from Privacy Technologies," Privacy Corps—Our Review, 2002, http://www.privacycorps.com/pages/product1.htm.
"MP3 Recorder Download—MP3 Recorder—Record Audio Stream to MP3 or WAV," 2002, http://www.mp3-recorder.net.
"NetMeeting101," http://www.meetingbywire.com/NetMeeting101.htm.
"Instructions on Application Sharing and Data Collaboration," VCON Escort and Crusier, http://www.vide.gatech.edu/docs/share/.
"Media-Tone—The 'Dial Tone' for Web Communications Services," Webex, 2003.
Data Connection, MailNGen, "Next Generation Messaging for Service Providers," Data Connection Limited, 2003-4.
Data Connection, Strategic Computer Technology, "Directories Explained," Data Connection Ltd, 1998-2004, http://www.dataconnection.com/inetapps/direxpl.htm.
Data Connection, Strategic Computer Technology, Directory Systems, "Directories and Meta-Directories," Data Connection Ltd, 1998-2004, http://www.dataconnection.com/inetapps/directory.htm.
Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.
Data Connection, Strategic Software Technology, "DC-SurroundSuite for Service Providers," Data Connection Ltd, 1998-2000, http://web.archive.org/web/20000914200355/www.dataconnection.com/messging/spssuite.htm.
Data Connection, Strategic Computer Technology, "Messaging Software Products and Services," Data Connection Ltd, 1998-2000, http://web.archive.org/web/20000819063320/www.dataconnection.com/messging/messgidx.htm.
Data Connection, Strategic Software Technology, "DC-Share for UNIX," Data Connection Ltd, 1998-2000, http://web.archive.org/web/20000914200713/www.dataconnection.com/conf/DCshare.htm.
Data Connection, Strategic Software Technology, "DC-H.323," Data Connection Ltd, 1998-2000, http://web.archive.org/web/20001120050600/www.dataconnection.com/conf/h323.htm.
Data Connection, Strategic Software Technology, "DC-WebShare," Data Connection Ltd, 1998-2000, http://web.archive.org/web/20001016115016/www.dataconnection.com/conf/webshare.htm.
Data Connection, Strategic Computer Technology, "DC-Recorder," Data Connection Ltd, 1998-2000, http://web.archive.org/web/20001016055611/www.dataconnection.com/conf/recorder.htm.
Data Connection, Strategic Software Technology, "DC-MeetingServer," Data Connection Ltd, 1998-2000, http://web.archive.org/web/20000914200719/www.dataconnection.com/conf/meetingserver.htm.
Data Connection, Strategic Computer Technology, "DC-MeetingServer," Data Connection Ltd, 1998-2000, http://web.archive.org/web/20021201144529/www.dataconnection.com/inetapps/conferencing.htm.
Data Connection, Strategic Software Technology, "DC-VoiceNet Features," Data Connection Ltd, 1998-2000, http://web.archive.org/web/20001016102614/www.dataconnection.com/messging/vnfeat.htm.

(56) References Cited

OTHER PUBLICATIONS

Data Connection, Strategic Software Technology, "DC-VoiceNet," Data Connection Ltd, 1998-2000, http://web.archive.org/web/20000914200424/www.dataconnection.com/messging/vnet.htm.
Data Connection, Strategic Computer Technology, "Messaging Software Products and Services," Data Connection Ltd, 1998-2000, http://web.archive.org/web/20010305143803/www.dataconnection.com/messging/messgidx.htm.
Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.
Data Connection, "SmartDialer Functional Overview," Version v1.0, Internet Applications Group, Data Connection Ltd., Nov. 3, 2003.
Data Connection, "SIP Market Overview, An analysis of SIP technology and the state of the SIP Market," Jonathan Cumming, Data Connection Ltd., 2003-2004.
Data Connection, "Integrating Voicemail Systems, A white paper describing the integration of heterogeneous voicemail systems," Michael James, Internet Applications Group, Data Connection Ltd., 2004.
Data Connection, Strategic Computer Technology, "MailNGen: Next generation messaging for Service Providers," Data Connection Ltd, 1998-2004, http://www.dataconnection.com/messaging/.
Data Connection, Strategic Computer Technology, "MailNGen: Unified Messaging," Data Connection Ltd, 1998-2004, http://www.dataconnection.com/messaging/unified_messaging.htm.
Data Connection, Strategic Computer Technology, "MeetingServer: The award-winning web conferencing solution for Service Providers," Data Connection Ltd, 1998-2005, http://www.dataconnection.com/conferencing/.
Data Connection, Strategic Computer Technology, "MeetingServer: The web conferencing solution for Service Providers," Data Connection Ltd, 1998-2004, http://www.dataconnection.com/conferencing/meetingserver.htm.
Data Connection, Strategic Computer Technology, "MeetingServer: Web conferencing architecture," Data Connection Ltd, 1998-2004, http://www.dataconnection.com/conferencing/meetingserver_arch.htm.
"The Mobile Phone User Guide", http://www.mobileshop.org/usertech/wildfire.htm, printed Oct. 1, 2004.
Komowski, J., "Wildfire at Your Back and Call-A Voice-Activated Telephone Assistant That Minds You and Your Messages", http://www.lacba.org/lalawyer/techwildfire.html, pronted Oct. 1, 2004.
Cisco Personal Assistant 1.4, Cisco Systems, Jun. 24, 2003, http://www.cisco.com/en/US/products/sw/voicesw/ps2026/prod_presentation_list.html, printed Oct. 1, 2004.
"Calendar Scheduling Teleconference Coimmunication Mechanism", IBM Technical Disclosure Bulletin, IBM Corp., New York, US, vol. 37, No. 3, Mar. 1, 1994, p. 561.
White, "How Computers Work", Millenium Edition, Sep. 1999, Que Corporation, pp. vi-xi, 135-184, 399-421.
Derfler et al., "How Networks Work", Bestseller Edition, 1996, Ziff-Davis Press, pp. vi-ix, 1-3, 21-70, 190-198.
Gralla, "How the Internet Works", Ziff-Davis Press, 1999, pp. vi-xi, 2-3, 8-11, 308-324.
Muller, "Desktop Encyclopedia of the Internet", Artech House Inc., 1999, ppv-xiv, 233-246, 539-559.
http://replay.waybackmachine.org/20020207142936/http://www.clicktocall.com/main.htm, Internet archive of website "www.clicktocall.com", dated Feb. 7, 2002.
Gaedke, et al., "Web Content Delivery to Heterogeneous Mobile Platforms", http://citeseer.ist.psu.edu/viewdoc/summary?doi=10.1.1.33.4361, 1998, 1-14.
Gessler, et at, "PDAs as mobile WWW browers", http://citeseer.ist.psu.edu/viewdoc/summary?doi=1 0.1.1.48.9198, 1995, 1-12.
Kunz, et at, "An Architecture for Adaptive Mobile Applications", http://citeseer.ist.psu.edu/viewdoc/summary?doi=1 0.1.1.40.624, 1999, 1-15.
Lauff, et al., "Multimedia Client Implementation on Personal Digital Assistants", http://citeseer.ist.psu.edu/viewdoc/summary?doi=10.1.1.6.6059, 1997, 1-15.
"How Internet Radio Works," Howstuffworks, http://computer.howstuffworks.com/internet-radio.htm/printable, Oct. 16, 2003.
"Telecommunications and Personal Management Services Linked in Collaboration by Verizon and Microsoft," Oct. 23, 2001, http://www.microsoft.com/presspass/press/2001/oct01/10-23MSVerizonPr.asp.
"Real-Time Collaboration Integration in the Portal," T. Odenwald, SAP Design Guild, http://www.sapdesignguild.org/editions/edition5/synch_collab.asp, Oct. 6, 2003.
"NetMeeting101," http://www.meetingbywire.com/NetMeeting101.htm, Oct. 6, 2003.
"NetMeeting102," http://www.meetingbywire.com/NetMeeting102.htm, Oct. 6, 2003.
"Instructions on Application Sharing and Data Collaboration," VCON Escort and Cruiser, http://www.vide.gatech.edu/docs/share/, Oct. 6, 2003.
"Instructions on Multipoint Application Sharing and Data Collaboration," VCON Escort and Cruiser with the RadVision MCU, http://www.vide.gatech.edu/docs/multi-share/, Oct. 6, 2003.
"File Transfer," Microsoft Windows Technologies Windows NetMeeting, last updated Jun. 4, 1999, http://www.microsoft.com/windows/netmeeting/features/files/default.asp.
"From Dial Tone to Media Tone," Analyst: R. Mahowald, IDC, Jun. 2002.
"MediaTone—The 'Dial Tone' for Web Communications Services," Webex, 2003, Dec.
Business Solutions/Professional, http://www.accessline.com/business_sol/bs_professional_body.html, Apr. 7, 2000.
"Accessline Comms' Accessline Service, The One-Number Wonder," *CommWeb*, T. Kramer, Feb. 1, 2000, http://www.cconvergence.com/article/TCM20000504S0014.
"InteleScreener," 2003, http://www.intelescreener.com/howitworks.html, Jun. 3, 2003.
"TeleZapper from Privacy Technologies," Privacy Corps—Our Review, 2002, http://www.privacycorps.com/pages/product1.htm, Mar. 17, 2004.
"A Proposal for Internet Call Waiting Service Using SIP," A. Brusilovsky et al., Lucent Technologies, PINT Working Group, Internet Draft, Jan. 1999.
"A Model for Presence and Instant Messaging", M. Day, et al. Fujitsu, Feb. 2000, Network Working Group, Request for Comments 2778.
"MP3 Recorder Download—MP3 Recorder—Record Audio Stream to MP3 or WAV," 2002 http://www.mp3-recorder.net, Oct. 24, 2003.
"FAQ Premium Home Answer" eVoice, http://content.evoice.com/wcs/signUp/FAQ_premHA s01.htm, Jul. 20, 2004.
"Voice-ASP, White Paper Technology & Processes," eVoice, Dec. 13, 2000.
"Voice-ASP, White Paper: Market Opportunities for Enhanced Voicemail," eVoice, Nov. 10, 2000.
"Audio Digitizing Process," TalkBank, http://www.talkbank.org/da/audiodig.html, Oct. 15, 2003.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-12).htm.
"Macromedia SoundEdit 16 Support Center-Working with Other Programs, What is Shockwave Audio Streaming?" http://www.macromedia.com/support/soundedit/how/shock/whatis.html, Oct. 24, 2003.
"Chapter 3: Overview," last updated Dec. 2, 1999, http://service.real.com/help/library/guides/q270/htmfiles/overview.htm.
"MP3 Recorder Download—MP3 Recorder—Record Audi Stream to MP3 or WAV," 2002, http://www.mp3-recorder.net, Oct. 24, 2003.
"FAQ Premium Home Answer" eVoice, http://content.evoice.com/wcs/signUp/FAQ_premHA_s01.htm, Jul. 2, 2001.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

(56) References Cited

OTHER PUBLICATIONS

"Macromedia SoundEdit 16 Support Center—Working with Other Programs, What is Shockwave Audio Streaming?" http://www.macromedia.com/support/soundedit/how/shock/whatis.html, Oct. 24, 2003.
"Chapter 3: Overview," last updated Dec. 2, 1999, http://service.real.com/help/library/guides/g270/htmfiles/overview.htm.
"File Transfer," Microsoft Windows Technologies Windows NetMeeting, last updated Jun. 4, 1999, http://www.microsoft.com/windows/netmeeting/features/files/default.asp, Oct. 6, 2003.
Business Solutions/Professional, http://www.accessline.com/business_sol/bs_professional_body.html, Apr. 17, 2003
"InteleScreener," 2003, http://www.intelescreener.com/howitworks.html, Jun. 3, 2003.
"TeleZapper from Privacy Technologies," Privacy Corps—Our Review, 2002, http://www.privacycorps.com/pages/product1.htm, Mar. 17, 2004.
"A Model for Presence and Instant Messaging," M. Day et al., Fujitsu, Feb. 2000, Network Working Group, Request for Comments 2778.
Data Connection, MailNGen, "Next Generation Messaging for Service Providers," Data Connection Limited, Apr. 2003, Jul. 2004.
Data Connection, Strategic Computer Technology, "Directories Explained," Data Connection Ltd, 1998-2004, http://www.dataconnection.com/inetapps/direxpl.htm, Jul. 2004.
Data Connection, Strategic Computer Technology, Directory Systems, "Directories and Meta-Directories," Data Connection Ltd, 1998-2004, http://www.dataconnection.com/inetapps/directory.htm, Jul. 2004.
Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm, Jul. 2004.
Data Connection, Strategic Software Technology, "DC-SurroundSuite for Service Providers," Data Connection Ltd, 1998-2000, http://web.archive.org/web/20000914200355/www.dataconnection.com/messging/spssuite.htm, Jul. 2004.
Data Connection, Strategic Computer Technology, "Messaging Software Products and Services," Data Connection Ltd, 1998-2000, http://web.archive.org/web/20000819063320/www.dataconnection.com/messging/messgidx.htm, Jul. 2004.
Data Connection, Strategic Software Technology, "DC-Share for UNIX," Data Connection Ltd, 1998-2000, http://web.archive.org/web/20000914200713/www.dataconnection.com/conf/DCshare.htm, Jul. 2004.
Data Connection, Strategic Software Technology, "DC-H.323," Data Connection Ltd, 1998-2000, http://web.archive.org/web/20001120050600/www.dataconnection.com/conf/hhtm, Jul. 2004.
Data Connection, Strategic Software Technology, "DC-WebShare," Data Connection Ltd, 1998-2000, http://web.archive.org/web/20001016115016/www.dataconnection.com/conf/webshare.htm, Jul. 2004.
Data Connection, Strategic Computer Technology, "DC-Recorder," Data Connection Ltd, 1998-2000, http://web.archive.org/web/20001016055611/www.dataconnection.com/conf/recorder.htm, Mar. 2005.
Data Connection, Strategic Software Technology, "DC-MeetingServer," Data Connection Ltd, 1998-2000, http://web.archive.org/web/20000914200719/www.dataconnection.com/conf/meetingserver.htm, Mar. 2005.
Data Connection, Strategic Computer Technology, "DC-MeetingServer," Data Connection Ltd, 1998-2000, http://web.archive.org/web/20021201144529/www.dataconnection.com/inetapps/conferencinq.htm, Mar. 2005.
Data Connection, Strategic Software Technology, "DC-VoiceNet Features," Data Connection Ltd, 1998-2000, http://web.archive.org/web/20001016102614/www.dataconnection.com/messging/vnfeat.htm, Jul. 2004.
Data Connection, Strategic Software Technology, "DC-VoiceNet," Data Connection Ltd, 1998-2000, http://web.archive.org/web/20000914200424/www.dataconnection.com/messging/vnet.htm, Jul. 2004.
Data Connection, Strategic Computer Technology, "Messaging Software Products and Services," Data Connection Ltd, 1998-2000, http://web.archive.org/web/20010305143803/www.dataconnection.com/messging/messgidx.htm, Jul. 2004.
Data Connection, Strategic Computer Technology, "DC-SurroundSuite for Enterprises," Data Connection Ltd, 1998-2000, http://web.archive.org/web/20010306082711/www.dataconnection.com/messging/enssuite.htm, Jul. 2004.
Data Connection, "SmartDialer Functional Overview," Version v1.0, Internet Applications Group, Data Connection Ltd., Nov. 3, 2003, Nov. 2003.
Data Connection, "SIP Market Overview, An analysis of SIP technology and the state of the SIP Market," Jonathan Cumming, Data Connection Ltd., 2003-2004, Sep. 2003.
Data Connection, "Integrating Voicemail Systems, A white paper describing the integration of heterogeneous voicemail systems," Michael James, Internet Applications Group, Data Connection Ltd., 2004, Jan. 2004.
Data Connection, Strategic Computer Technology, "MailNGen: Next generation messaging for Service Providers," Data Connection Ltd, 1998-2004, http://www.dataconnection.com/messaging/, Jul. 2004.
Data Connection, Strategic Computer Technology, "MailNGen: Unified Messaging," Data Connection Ltd, 1998-2004, http://www.dataconnection.com/messaging/unified_messaging.htm, Jul. 2004.
Data Connection, Strategic Computer Technology, "MeetingServer: The award-winning web conferencing solution for Service Providers," Data Connection Ltd, 1998-2005, http://www.dataconnection.com/conferencing/, Mar. 2005.
Data Connection, Strategic Computer Technology, "MeetingServer: The web conferencing solution for Service Providers," Data Connection Ltd, 1998-2004, http://www.dataconnection.com/conferencing/meetingserver.htm, Jul. 2004.
Data Connection, Strategic Computer Technology, "MeetingServer: Web conferencing architecture," Data Connection Ltd, 1998-2004, http://www.dataconnection.com/conferencing/meetingserver_arch.htm, Jul. 2004.
"MeetingServer: Broadband for Learning Case Study," Data Connection Ltd, http://www.dataconnection.com/conferencing/meetingserver_casestudy.htm, three pages, Retrieved from the internet on Jul. 20, 2004.
Chou, "Inside SSL: The Secure Sockets Layer Protocol," IT Professional, vol. 4, Issue 4, pp. 47-52, Jul./Aug. 2002.
Wagner, et al., "Analysis of the SSL 3.0 Protocol," Proceedings of the 2nd Conference on Proceedings of the Second USENIX Workshop on Electronic Commerce (WOEC'96) vol. 2, 12 pages, Nov. 1996.

\* cited by examiner

| Time 620 | Date 622 | Caller ID 624 | Audio File 626 |
|---|---|---|---|
| 10:55 PM | 04.09.03 | Brian Roberts | voice1.wav |
| 09:32 AM | 04.14.03 | John Smith | voice2.wav |
| | | | |

METHODS AND SYSTEMS FOR NOTIFICATION OF CALL TO DEVICE

RELATED APPLICATIONS

Applicants claim the right to priority under 35 U.S.C. § 119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/083,792, entitled "VOICE MAIL INTEGRATION WITH INSTANT MESSENGER," filed Feb. 27, 2002, U.S. patent application Ser. No. 10/083,884, entitled "DEVICE INDEPENDENT CALLER ID," filed Feb. 27, 2002, and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002, U.S. patent application Ser. No. 10/083,793, entitled "METHOD AND APPARATUS FOR CALENDARED COMMUNICATIONS FLOW CONTROL," filed Feb. 27, 2002, U.S. patent application Ser. No. 10/084,121, entitled "CALENDAR-BASED CALLING AGENTS," filed Feb. 27, 2002, U.S. patent application Ser. No. 10/084,121, entitled "METHODS AND SYSTEMS FOR DRAG AND DROP CONFERENCE CALLING," U.S. patent application Ser. No. 10/720,661, entitled "METHODS AND SYSTEMS FOR CONFERENCE CALL BUFFERING," U.S. patent application Ser. No. 10/720,859, entitled "METHODS AND SYSTEMS FOR COMPUTER ENHANCED CONFERENCE CALLING," U.S. patent application Ser. No. 10/721,009, entitled "METHODS AND SYSTEMS FOR REMOTE CALL ESTABLISHMENT," U.S. patent application Ser. No. 10/720,943, entitled "METHODS AND SYSTEMS FOR CALL MANAGEMENT WITH USER INTERVENTION," U.S. patent application Ser. No. 10/721,005, entitled "METHODS AND SYSTEMS FOR DIRECTORY INFORMATION LOOKUP," U.S. patent application Ser. No. 10/720,868, entitled "METHODS AND SYSTEMS FOR AUTOMATICALLY FORWARDING CALLS TO CELL PHONE," U.S. patent application Ser. No. 10/720,970, entitled "METHODS AND SYSTEMS FOR ADAPTIVE MESSAGE AND CALL NOTIFICATION," U.S. patent application Ser. No. 10/720,952, entitled "METHODS AND SYSTEMS FOR A CALL LOG," U.S. patent application Ser. No. 10/720,870, entitled "METHODS AND SYSTEMS FOR AUTOMATIC FORWARDING OF CALLS TO A PREFERRED DEVICE," U.S. patent application Ser. No. 10/720,663, entitled "METHODS AND SYSTEMS FOR MULTI-LINE INTEGRATED DEVICE OR LINE MANAGEMENT," U.S. patent application Ser. No. 10/720,971, entitled "METHODS AND SYSTEMS FOR CONTACT MANAGEMENT," U.S. patent application Ser. No. 10/720,784, entitled "METHODS AND SYSTEMS FOR SINGLE NUMBER TEXT MESSAGING," U.S. patent application Ser. No. 10/720,825, entitled "METHODS AND SYSTEMS FOR MULTI-USER SELECTIVE NOTIFICATION," U.S. patent application Ser. No. 10/720,944, entitled "METHODS AND SYSTEMS FOR CPN TRIGGERED COLLABORATION," and U.S. patent application Ser. No. 10/720,933, entitled "METHODS AND SYSTEMS FOR PREEMPTIVE REJECTION OF CALLS," all of which are expressly incorporated herein by reference in their entirety.

TECHNICAL FIELD

The present invention relates to methods and systems for providing a user of a wireless handset with a notification of incoming calls, voice mail messages, and SMS messages for devices other than the user's wireless handset.

BACKGROUND

A wide variety of means exist for communication between users. For example, a user may conduct phone calls via a home phone, work phone, and mobile phone. In addition, users may also communicate using devices such as PC's, PDA's, pagers, etc. using manners of communicating as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

Typically, to implement communication management, a person must individually manage each communication device separately. Thus, when the user wishes to change how communication is managed, the user may have to deal with numerous devices and, perhaps, service centers.

For example, previous notification systems, such as pager notification from a voice mail server, require a calling party attempting to contact a user to send a message to a specific pager device. However, if the calling party instead dials the user's home phone number, the calling party might leave a voice mail message on a voice mail system for a device currently inaccessible to the user. As a result, the user would not receive the voice mail message until a later time.

To keep apprised of communications, the user may dial into a voice mail system using an available device to check for messages or missed calls on unavailable devices. For example, if the user is away from the home or office, the user may have a cell phone for calling a work or home voice mail system to check for messages and missed calls. However, such an approach requires the user to dial into these voice mail systems periodically to check for messages and missed calls. As a result, the user may learn of missed calls and messages after a significant passage of time. Alternatively, the user may spend time unnecessarily to check voice mail systems for nonexistent messages.

Therefore, there is a need for a method and system for providing a user's preferred device with a notification of a call, voice mail message, or SMS message for a device other than the user's preferred device. Accordingly, the user may receive timely notifications of incoming calls, voice mail messages, and SMS messages regardless of the user's location.

SUMMARY

Consistent with the present invention, as embodied and broadly described herein, methods and systems provide a user of a wireless device with notifications of incoming calls, voice mail messages, and SMS messages for devices other than the user's wireless device.

An embodiment consistent with the principles of the present invention provides a method for providing a notification to a preferred communication device of a user, the user having a plurality of communication devices each having a communication channel. Information is received on a communication device, the information indicating incoming data for the communication device. A notification is received from the communication device at a server. And a notification is transmitted to the user's preferred device, the notification including an identification of the type of the incoming data.

An embodiment consistent with the principles of the present invention provides an apparatus for providing a notification to a preferred communication device of a user, the user having a plurality of communication devices each having a communication channel. A communication device receives information indicating incoming data to one of a plurality of devices of the user, the data being in the form of one of a plurality of data types. A server receives a notification from the communication device and transmits the notification to the user's preferred device, the notification including an identification of the type of the incoming data.

An embodiment consistent with the principles of the present invention provides a method for providing a notification to a preferred communication device of a user, the user having a plurality of communication devices each having a communication channel. Information is received on a communication device from a calling party calling one of the plurality of devices. A notification is generated corresponding to the received information. And the notification is transmitted from the communication device to the preferred device to display a real-time notification.

An embodiment consistent with the principles of the present invention provides an apparatus for providing a notification to a preferred communication device of a user, the user having a plurality of communication devices each having a communication channel. The apparatus includes a communication device for receiving or generating data, the information being in the form of one of a plurality of data types, and a server for receiving the data from the communication device and for transmitting the data to the user's preferred device.

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention.

BRIEF DESCRIPTION OF THE DRAWINGS

The accompanying drawings, which are incorporated in and constitute a part of this specification, illustrate one embodiment consistent with the invention and, together with the description, serve to explain the principles of the invention.

FIG. 6 is an exemplary data structure used for providing caller identification information, in accordance with methods and apparatus consistent with the present invention.

DETAILED DESCRIPTION

Consistent with the present invention, as embodied and broadly described herein, methods and systems provide a user with notifications of incoming calls, voice mail messages, and SMS messages for a wireless device on the user's preferred device.

For example, the present invention may be implemented for use with wireless devices or handsets equipped with Qualcomm's Binary Runtime Environment for Wireless (BREW). BREW is a software development platform by Qualcomm and is available on certain wireless devices. Devices enabled with BREW allow developers to create software that will run on these wireless devices. In addition to the BREW platform, other software-enabled devices may be used to implement the present invention. Other software platforms available for wireless phones, for example, include Java 2 Micro Edition (J2ME) from Sun Microsystems, Inc., which is available on phones from Motorola, LG, Nokia, and other manufacturers, and Microsoft SmartPhone 2002, which is available on phones from Samsung and other manufacturers.

Consistent with the principles of the present invention, capabilities of a phone software platform are used for sending notifications of incoming calls, incoming voice mail messages, and incoming SMS messages to a digital companion server. The digital companion server may then provide a remote view of the activity on a user's preferred device.

Reference will now be made in detail to exemplary embodiments of the present invention, examples of which are illustrated in the accompanying drawings. Wherever possible, the same reference numbers will be used throughout the drawings to refer to the same or like parts.

Figure 1:
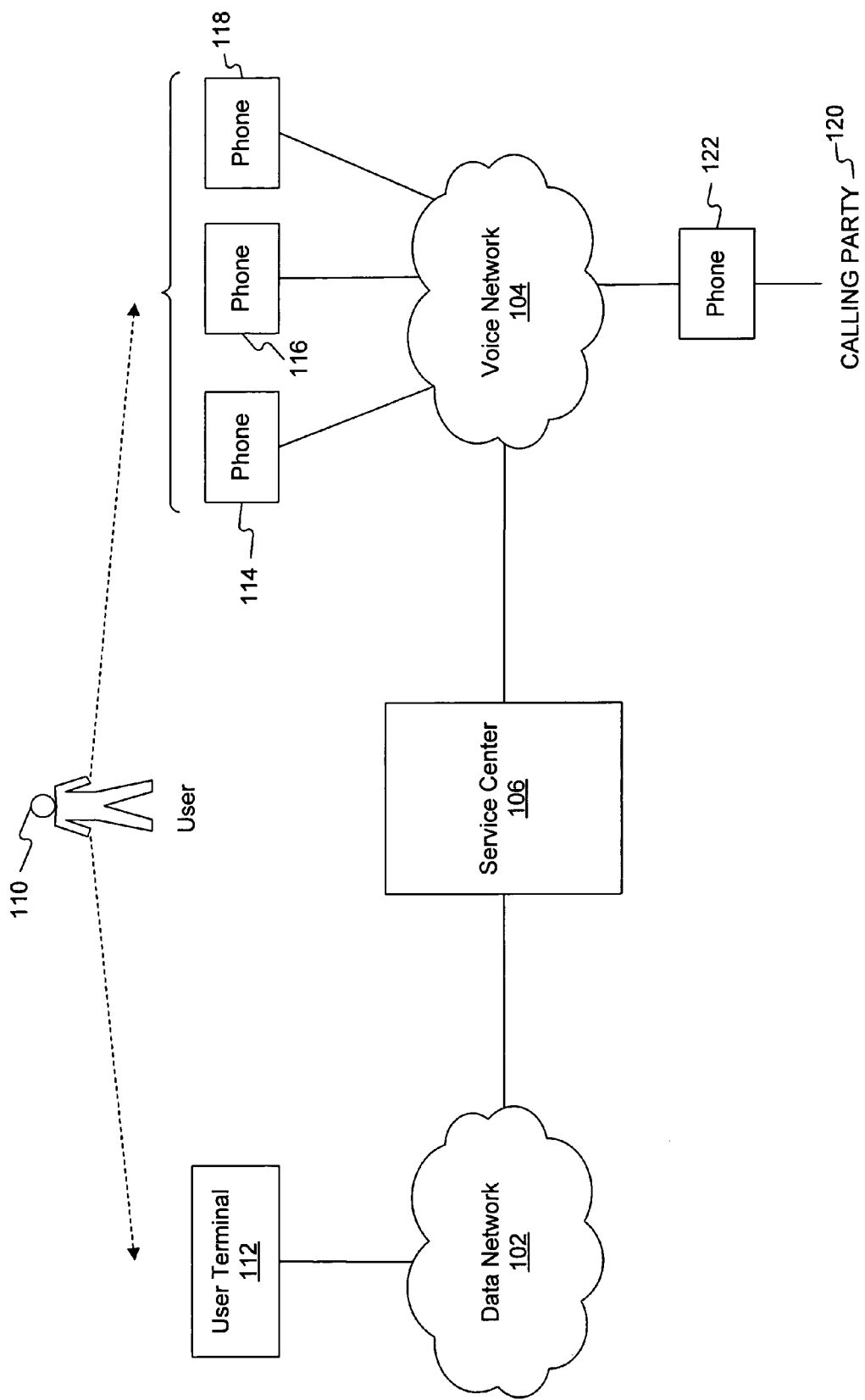
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. A calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, the service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented using voice-over Internet Protocol ("VoIP") technology. In addition, voice network 104 may be implemented using both PSTN and VoIP technology consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides an interface to data network 102 for user 110. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104. One or more of phones 114, 116, 118, and 112 may be associated with user 110. For example, phone 114 may be a home phone billed to user 110, phone 116 may be a mobile phone billed to user 110, and phone 118 may be a home phone billed to a friend of user 110. Phones 114 and 116 may be billed to the same or different accounts of user 110, for example.

Figure 2:
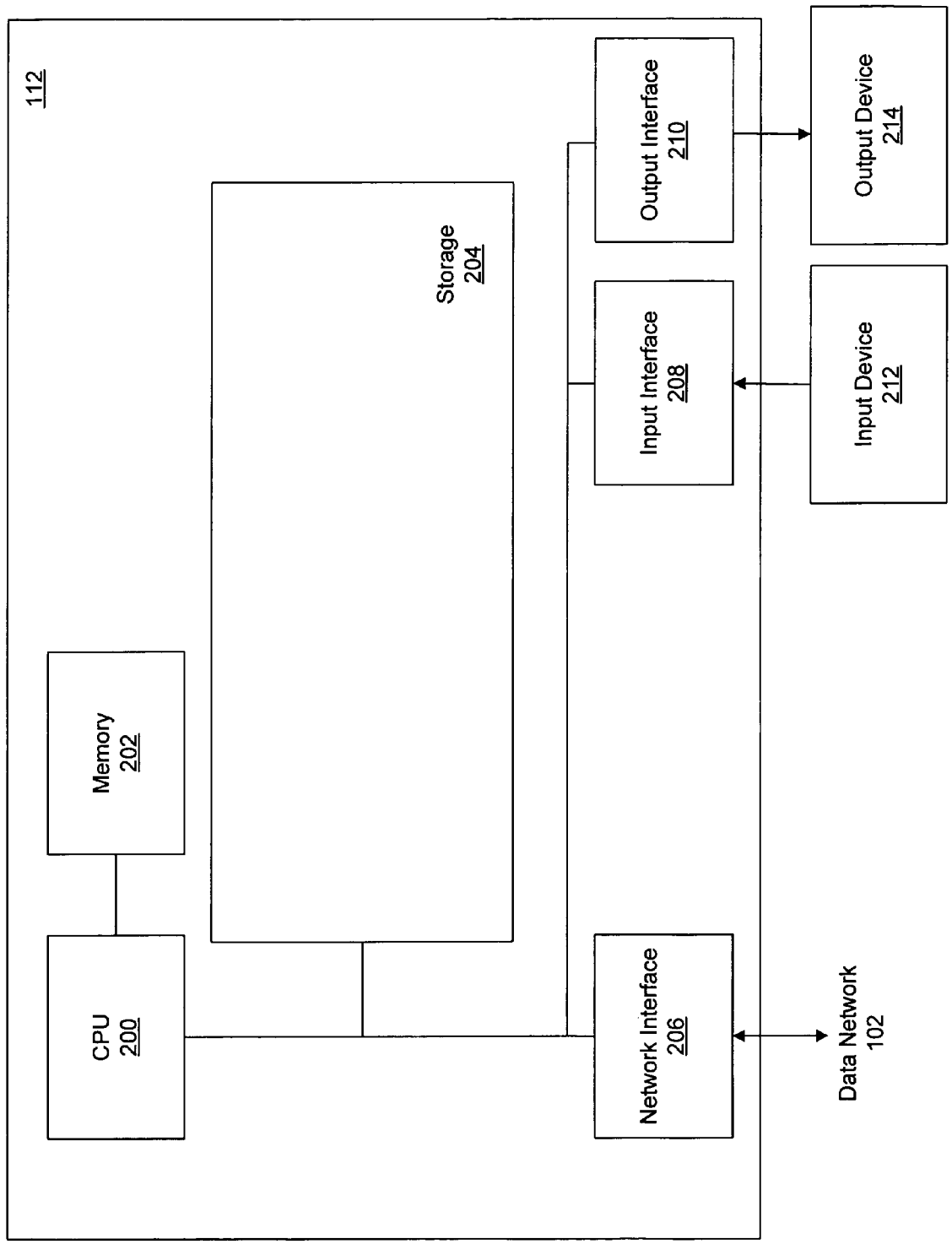
FIG. 2 is a diagram of an exemplary user terminal, consistent with the principals of the present invention.

FIG. 2 is a block diagram of a user terminal consistent with the present invention. User terminal 112 includes a central processing unit (CPU) 200, a memory 202, a storage module 204, a network interface 206, an input interface 208, an output interface 210, an input device 212, and an output device 214.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
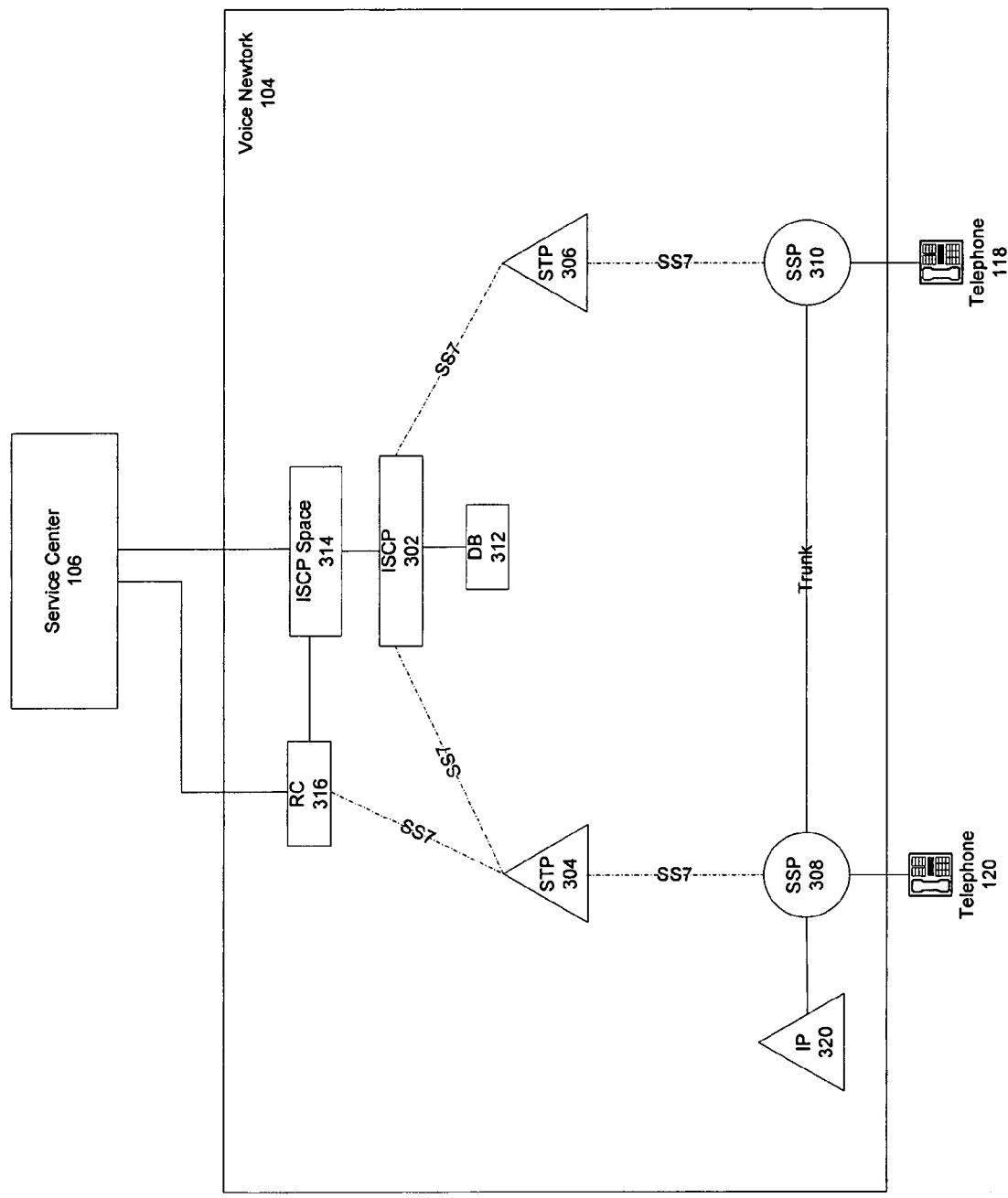
FIG. 3 is a diagram of a voice network, consistent with the principles of the present invention.

FIG. 3 is a more detailed diagram of voice network 104, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, and an Intelligent Peripheral (IP) 320.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP) or an Advanced Intelligent Network (AIN) SCP. ISCP 302 provides translation and routing services of SS7 messages to support the features of voice network 104, such as call forwarding. In addition, ISCP 302 may exchange information with the service center 106 using TCP/IP or SS7. ISCP 302 may be implemented using a combination of known hardware and software. Although ISCP 302 is shown with a direct connection to service center 106 through ISCP SPACE 314, any number of network elements including routers, switches, hubs, etc., may be used to connect ISCP 302 and service center 106.

STPs 304 and 306 relay SS7 messages within voice network 104. For example, STP 304 may route SS7 messages between SSPs 308 and 310. STP 302 may be implemented using known hardware and software from manufacturers such as NORTEL™ and LUCENT Technologies™.

SSPs 308 and 310 provide an interface between voice network 104 and phones 114 and 120, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may include subscriber information, such as a service profile, name and address, and credit card validation information.

ISCP Service Provisioning and Creation Environment (SPACE) 314 may be included as part of ISCP 302 or be separate from ISCP 302. For example, a Telcordia™ ISCP may provide the functions of SPACE 314 as part of system 100. Further, ISCP SPACE 314 may include one or more servers. ISCP SPACE 314 is the point in the ISCP platform where user record updates may be made.

In one embodiment, user records may be stored in ISCP SPACE 314 such that the records may be updated and sent to ISCP 302. These records may include information regarding how to handle calls directed to the user. For example, these user records may include information regarding whether or not calls for the user are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, the voice network 104 may include one or more recent change engines 316 such as, for example, an Enterprise Recent Change engine (eRC); an Assignment, Activation, and Inventory System (MIS); or a multi-services platform (MSP). As an example, the eRC and AAIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and the ISCPs 302. Alternatively, an eRC may be used, for example, to provide updates to the SSPs 308 or 310, while an AAIS is used for providing updates to the ISCPs 302.

Figure 4:
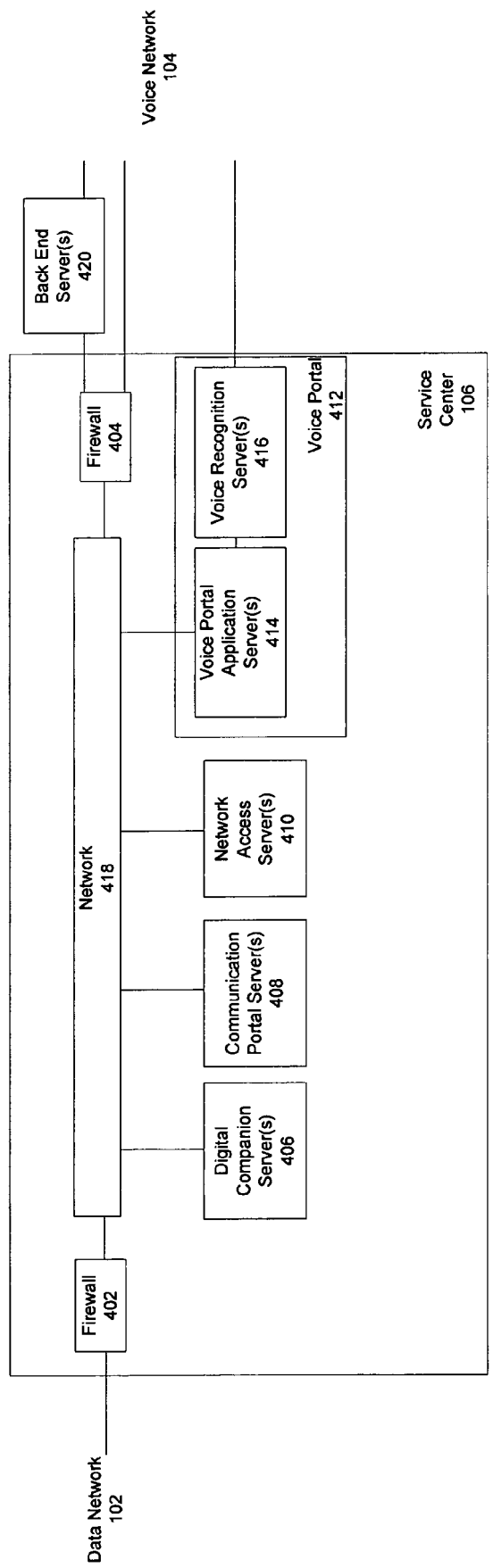
FIG. 4 is a block diagram of a service center, consistent with the principles of the present invention.

Additionally, voice network 104 may include one or more intelligent peripherals (IP). Referring to FIG. 4, an IP 320 is illustrated as being connected to SSP 308. These IPs may be used for providing services, such as voice mail services.

FIG. 4 is a block diagram of service center 106, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a voice portal application server 414 and a voice recognition server 416. A network 418 may be used to interconnect the firewalls and servers. Additionally, back end server(s) 420 may be provided between the service center 106 and voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any appropriate security policy may be implemented in firewalls 402 and 404 consistent with the principles of the present invention. For example, firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any appropriate type of network, such as an Ethernet or FDDI network. Additionally, network 418 may also include switches and routers, as appropriate, without departing from the scope of the invention. Further, additional firewalls may be present in network 418, for example, to place one or more of servers 406, 408, 410, or voice portal 412 behind additional firewalls.

Each server (406, 408, 410, 414, 416, 420) may be any type of appropriate server or computer, such as a Unix or DOS based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of service center 106. Exemplary services include, for example, permitting a user 110 to add contacts to an address book from a history of calls made or received by user 110, permitting a user 110 to make calls from numbers retrieved from their address book, scheduling a call to be placed at a specific time, or permitting the user 110 to access and view a name and/or address associated with a phone number. Additionally, these services may include permitting the user 110 to listen to voice mail messages on-line over the Internet, forward their calls based on a scheduler and/or the calling parties number, setting up conference calls on-line, etc. Particularly, the user may receive a notification of incoming calls, voice mail messages, and SMS messages for devices 114-122 other than the user's home phone 112.

A communication portal server 408 may provide the hardware and software for managing a user's account and interfacing with user account information stored by the provider of user's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 includes software and hardware for receiving and processing instructions from a user via voice. For example, a user may dial a specific number to directly access voice portal 412. Then the user, using speech, may provide instructions for service center 106 to modify the services to which the user subscribes. Voice portal 412 may include, for example, a voice recognition server 416 and an application server 414. Voice recognition server 416 may receive and interpret dictation, or recognize spoken commands. Application server 414 may take, for example, the output from voice recognition server 416, convert it to a format suitable for service center 106 and forward the information to one or more servers (406, 408, 410) in service center 106.

Figure 5:
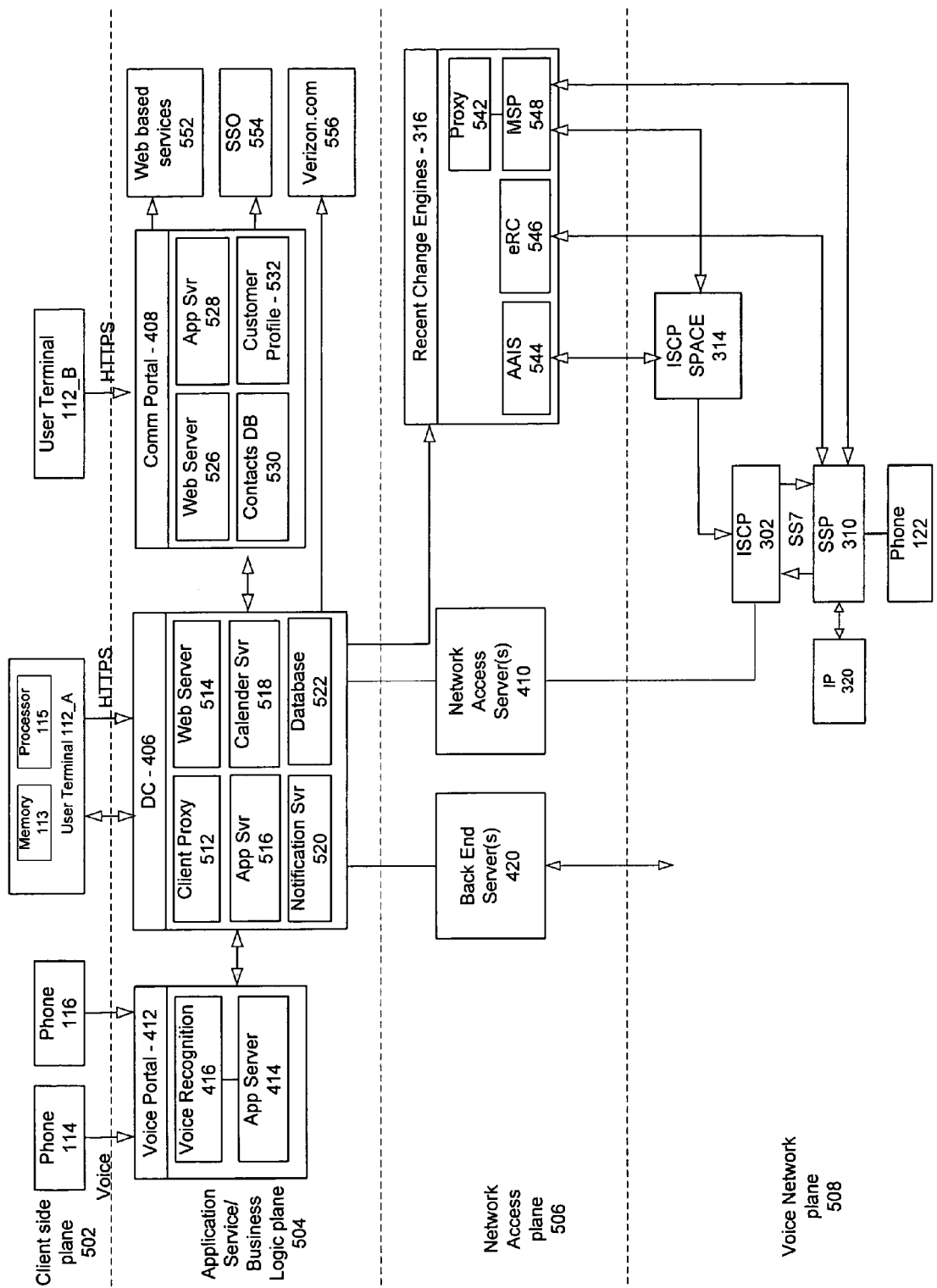
FIG. 5 illustrates a logical architecture of an exemplary system, consistent with the present invention.

FIG. 5 illustrates a logical architecture of an exemplary system, consistent with the present invention. As illustrated, the logical architecture may be split into four sections, or planes: client side 502, application service 504, network access 506, and voice plane 508.

Client side 502 includes user terminals 112_A and 112_B that a user may use to send and/or receive information to/from service center 106. Additionally, client side 502 includes user's phone(s) 114. As discussed above, user terminals 112 may be any type of appropriate device a user may use for communicating with Service Center 106. For example, user terminal 112_A may be a PDA running a program for communicating with Service Center 106, while user terminal 112_B may be a desktop type computer running a web browser for communicating with Service Center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, digital companion server 406 may provide the following functions: a client proxy function 512, a web server function 514, an application server function 516, a calendar server function 518, a notification server function 520, and a database server function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server 514 provides functionality for receiving traffic over data network 102 (FIG. 1) from a user. For example, web server 514 may be a standard web server that a user may access using a web browser program, such as Internet Explorer or Netscape Communicator.

Application server function 516 encompasses the general functions performed by digital companion server(s) 406. For example, these functions may include interfacing with the various other digital companion functions to perform specific applications provided by the service center. These services may include, for example, interfacing with other function(s), software, and/or hardware to provide a user with the capability of managing their calls online. For example, permitting a user to add contacts to their address book from a history of calls made or received by the user, permitting a user to make calls directly from their address book, scheduling a call to be placed at a specific time, or permitting the user to look at the name and/or address associated with a phone number. Additionally, these services may include permitting the user to listen to their voice mail messages on-line, forwarding their calls based on a scheduler and/or the calling parties number, setting up conference calls on-line, etc.

Consistent with the present invention, a call notification service provides a user with a notification of an incoming call for one of a plurality of the user's devices on the user's preferred device. Also, consistent with the present invention, a voice mail notification service provides a user with a notification of a voice mail message for one of a plurality of the user's devices on the user's preferred device.

Additionally, application server function 516 may interface with one or more external devices, such as an external web server, for retrieving or sending information. For example, application server function 516 may interface with a voice network's data center 556 (e.g., verizon.com) to determine the services to which the user subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from service center 106 to a user terminal 112. For example, notification server function 520 at the direction of application server function 516 may send a notification to user terminal 112 that the user is presently receiving a phone call at user's phone 114.

Database function 522 stores information, in the form of databases, useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a user's account and interfacing with user account information stored by the provider of user's voice network 104. As illustrated in FIG. 5, communication portal server 408 may provide the following functions: a web server function 526, an application server function 528, a contacts database function 530, and/or a user profile function 532. Each of these functions may be performed by a separate server, split across multiple servers, included on the same server functions, or any other manner.

Web server function 526, as with web server function 514 of the digital companion servers, provides functionality for receiving traffic over data network 102 from a user. For example, the web server may be a standard web server that a user may access using a web browser, such as Internet Explorer or Netscape Communicator.

Application server function 528 encompasses the general functions performed by communication portal servers 408. For example, these functions may include interfacing with the voice network to retrieve and/or modify user profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the Superpages webpage. Application function 528 may then contact these external services 552 to retrieve information, such as an address for a person in the user's address book.

In another example, application server function 528 of communication portal 408 may interface a single sign on (SSO) server 554. SSO 554 may be used to allow users to access all services to which the user subscribes, on the basis of a single authentication that is performed when they initially access the network.

Contacts database 530 includes storage devices for storing data forming an address book for the user. This address book may be any appropriate type of address book. For example, the user's address book may include the names, phone numbers, and addresses of people and/or organizations. These storage devices may be internal or external to communication portal servers 406 or some combination in between. In addition, these storage devices may be any type of storage device, such as magnetic storage, memory storage, etc.

User profile database 532 includes storage devices for storing user profile information for the user. These storage devices may be the same or separate storage devices used for the contacts database. The user profile may include information regarding the user's account for their voice network. For example, this information may include the user's name, billing address, and other account information. Additionally, the user profile may include information regarding voice services to which the user subscribes, such as, for example, call waiting, voice mail messages, etc. Using these services, the user may receive notifications of incoming calls, voice mail messages, and SMS messages for devices other than the user's wireless handset.

Additionally, application services plane 504 of the architecture may include voice portal 412. As discussed above, voice portal 412 may include, for example, a voice recognition function 416 and an application server function 414, and be used for receiving and processing instructions from a user via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network Access plane 506 of the architecture includes the functions for providing connectivity between application service plane 502 and voice network 104. For example, this plane may include recent change engines 316, network access servers 410, and/or back end servers 420.

As discussed above, recent change engines 316 may be used to update switches and ISCP databases included in the voice network 104. In one embodiment, recent change engines 316 may include an AAIS 544, an eRC 546, and/or an MSP 548. Additionally, a proxy 542 may be used between digital companion servers 406 and recent change engines 542 for security purposes.

Network access servers 410 may be included in the service center 106 and may provide the hardware and software for sending and receiving information to the voice network 410 in processing the applications provided by the service center. For example, network access servers 410 may include a Caller ID (CID) functionality for retrieving caller ID information from voice network 104, a click to dial (CTD) functionality for instructing an intelligent peripheral (IP) in the voice network to place a call via an SSP, and/or a real time call management (RTCM) functionality for interfacing with an ISCP of the voice network.

Network Access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. For example, this voice mail retrieval and notification function may communicate with a voice mail storage system on IP 320 to receive signals when a voice mail message is stored in a user's voice mail box, send appropriate codes to retrieve the voice mail message, retrieve the voice mail message, convert the voice mail message to a digital file, and send it to digital companion servers 406.

Additionally, back end server(s) 420 may include, for example, a directory assistance server. This directory assistance server may, for example, interface service center 106 with a Reverse Directory Assistance Gateway (RDA Gateway) of voice network 104. A RDA Gateway is a device for issuing requests to a Data Operations Center (DOC) of voice network 104 for name and/or address information associated with a phone number and receiving the name and/or phone number in response to this request.

In another example, back end server(s) 420 may include a wireless internet gateway that is used for interfacing with a mobile switching center (MSC) of a wireless voice network. As with the above-described back end server(s) 420, this wireless internet gateway may be used for converting requests and information between the formats used by service center 106 and those used by the wireless voice network.

In yet another example, back end server(s) 420 may include a conference blasting server for instructing a conference bridge in the voice network 106 to dial out via an SSP to the participants of a voice conference. Alternatively, back end server(s) may include, for example, a server for instructing an IP of the voice network to place a call between two parties by dialing out to each of the parties. The back end server(s) may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, back end server(s) 420 may include a Single Number Short Message Service (SN SMS) server for interfacing service center 106 with a SMS gateway in the voice network 104. This may be used for example to direct SMS messages addressed to the number of a user's home phone 114 to an SMS-capable device of the user's choosing such as phone 116.

Voice network plane 508 includes the hardware and software included in voice network 104, as discussed above with reference to FIG. 3. For example, voice network plane 508 may include ISCP SPACE 314, ISCP 302, intelligent peripherals 320, and SSP 310. Additionally, voice network plane 508 may also include the hardware and software included in a wireless carrier's network, such as, for example, the mobile switching center, etc.

In accordance with an embodiment consistent with the principles of the present invention, a user terminal, such as terminal 112_A, may support two different connections simultaneously. For example, user terminal 112_A may support both voice and data simultaneously, or alternatively, may support two data connections simultaneous.

In particular, user terminal 112_A may have the capacity to transmit and receive data at the same time using two connections. User terminal 112_A may be a processor communication device, for example, that may receive data via a HTTP connection over a communications channel and voice via a standard telephone connection. A communications channel may include, for example, a standard twisted pair wire, a cell phone receiving communications over a wireless network channel, or a hardwired or wireless Internet connection, for example. Alternatively, user terminal 112_A may receive data via two HUTP connections simultaneously.

In addition, user terminal 112_A may have the ability to store settings in a memory and allow the software executing on the device to access the settings and make any change to the settings. For example, the status of the ringer may be changed, the actual ring tone may be changed, and the date and time displayed on the device may be changed. User terminal 112_A may also include various sensors (not shown) for generating data, such as a lens for providing a digital camera, a sensor for determining temperature, and a GPS (Global Positioning System) capability, for example. Data obtained from these sensors may be saved in memory of user terminal 112_A and can be accessed by software executing on user terminal 112_A. Further, user terminal 112_A may transmit any data obtained by sensors or received by the user terminal 112_A via the HTTP connection over a communications channel. In addition, when user terminal 112_A has been set to a private setting, quiet setting, or is turned off, incoming data may instead be sent to digital companion server 406, for example.

A calling party may place a call to a user at user terminal 112_A. Upon receipt of the call, software residing on user terminal 112_A in a memory 113 executes on a processor 115 to receive a call notification, and allow the call to complete. Once the call is completed to user terminal 112_A, the software residing in memory 113 establishes communication via an existing HTTP connection from user terminal 112_A to digital companion server 406. Alternatively, if an HTTP connection is not in existence, the software causes processor 115 on user terminal 112_A to create an HTTP connection.

After establishing the connection between the user terminal 112_A, software residing on user terminal 112_A generates a call notification. Referring to FIG. 6, there is shown an exemplary diagram of the type of information included in a call notification sent by user terminal 112_A.

FIG. 6 is a caller ID notification data structure, in accordance with methods and apparatus consistent with the principles of the present invention. A caller ID notification data structure table 600 illustrates the type of information available to a user when a caller ID is received. Each line of caller ID notification data structure table 600 represents a caller ID notification event. Each caller ID notification event includes a time 620, a date 622, and caller ID 624, which may be a calling party's name or phone number, or both. Additionally, audio file 626 may optionally include a voice message. The caller ID is information stored on the source of a call.

The caller ID information may be passed to application service level 504 (FIG. 5), and more particularly, to digital companion server 406. Once received by notification server 520, the caller ID information is stored by database function 522. Database function 522 provides for the storage of information used by the various applications executed by digital companion server 406.

As indicated in FIG. 5, application server function 528 encompasses the general functions performed by the communication portal servers 408. For example, these functions may include interfacing with the voice network to retrieve and/or modify user profile information, and creating and editing an address book for the user. Additionally, application server function 528 may include the functionality of sending and/or receiving information to/from external servers and/or devices.

To select a preferred device for receiving notifications, the user may, for example, communicate with digital companion server 406 by executing digital companion client software on terminal 112_B. For example, the user may access a web page resident in digital companion server 406 to enter the telephone number or other identifying indicator specifying the preferred device. Alternatively, the user may use phone 114 to place a call to a service number at voice portal 412 whereby the user may interact with automated voice response menus or may speak with a user service representative to specify a preferred device. In yet another alternative, user 110 may interact with digital companion client software on terminal 112_A to transmit a phone number of the preferred device to digital companion server 406. The identity of the device specified by the user as the preferred device is stored in database 522.

After initialing specifying a preferred device, the user may subsequently change the preferred to device to a different device by repeating the aforementioned process. Additionally, the user may specify a particular preferred device for receiving notifications based on the time of day or week. As such, the user may set in advance time periods during which different devices are specified as preferred devices to receive notifications. As is apparent to one of skill in the art, a variety of methods and systems may be implemented to facilitate the user's selection of a preferred device in keeping with the spirit and scope of the present invention.

Application server function 516 may determine the preferred device, as specified by the user, by querying database function 522. The user may have previously selected a phone, such as phone 114, user terminal 112_A, or user terminal 112_B as a preferred device. For example, phone 114 may be a landline or wireless phone, user terminal 112_A may be client software, for example, and user terminal 112_B may include a web browser for web-based viewing of alerts.

Application server function 516 may also determine whether the user is currently logged into a digital companion client or currently has a preferred device logged on application service/business logic plane 504. If it is determined that no such log-ons currently exist, then any call notifications stored in database function 522 are not sent until such time as the user next logs on or turns on a device 112_A, 112_B, or 114 making a data or voice connection with application service/business logic plane 504. For example, when a device becomes active, database 522 may be queried by application server function 516 for notifications that have not been sent and then may send the saved notifications.

Client proxy function 512 provides the capability to send information from digital companion server 406 to user terminal 112. For example, after the user's preferred device is determined, client proxy function 512, at the direction of application server function 516, sends an incoming call notification to the user's preferred device. For example, if the user has previously selected phone 114 as a preferred device, then client proxy function 512 sends the notification to voice portal 412. Voice portal 412 may convert the call notification into a voice message using, for example, voice recognition 416 at the direction of application server 414, which then sends the incoming call notification to phone 114.

Alternatively, if the user's preferred device is user terminal 112_A, then client proxy function 512 sends the notification to user terminal 112_A. As another exemplary alternative, if the user's preferred device is user terminal 112_B, client proxy function 512 sends the notification to communications portal 408, which includes web server 526. Application server 528 may process the notification and sent it to user terminal 112_B.

The incoming call notification sent to the user's preferred device may consist of a text message, for example, indicating an incoming call. The message may indicate the name and phone number of the calling party. For example, if the notification is sent to user terminal 112_A, the client software therein may display the notification. If the notification is sent to user terminal 112_B, the notification may be displayed as part of an HTML page loaded on a web browser. Additionally, if the preferred device is phone 114, phone 114 may simply ring, display the caller ID information, or play back an audio file of the caller ID information, including the name and phone number of the calling party on a display screen.

In accordance with another embodiment consistent with the principles of the present invention, a user terminal, such as terminal 112_A, may support two different connections simultaneously. For example, user terminal 112_A may support both voice and data simultaneously, or alternatively, may support two data connections simultaneous.

A calling party may leave a voice mail message for user 110. The voice mail message may be stored on a voice mail server residing, for example, on back end servers 420 or IP 320. The voice mail server may route the voice mail message to digital companion server 406, which in turn may route the voice mail message to user terminal 112_A.

Upon receipt of the voice mail message, software residing on user terminal 112_A in memory 113 may store the voice mail message for later playback by the user. Alternatively, digital companion server 406 may send a notification of the voice mail message to user terminal 112_A. The voice mail message is then stored for later retrieval of the voice mail message and may reside remotely on a voice mail notification and storage server (not shown) on back end servers 420.

Similar to processing of a call, described above, a voice mail notification processed by client software residing in memory 113 on user terminal 112_A, which connects via a HTTP connection to digital companion server 406. Alternatively, if the HTTP connection is not available, the client software requests that the software platform on user terminal 112_A create the HTTP connection.

After establishing the HTTP connection between the user terminal 112_A, the client software residing on user terminal 112_A generates a voice mail data record that is transmitted to notification server 520. An exemplary diagram of the type of information contained in the voice mail data record is shown in FIG. 6. Additionally, audio file 626 may store the voice mail message of the calling party.

The voice mail data record received by the notification server function 520 is then stored by database function 522. Application server function 516 may determine the user's preferred device as stored in database 522 and determine whether user 110 is logged onto a voice network or data network.

Client proxy function 512 may then send a voice mail notification to the user's preferred device. The voice mail notification may consist of a text message, for example, indicating a new voice message. The message may include the name and phone number of the calling party. Additionally user terminal 112 may provide user 110 with the option of selecting a function to playback the voice mail audio file 626.

In accordance with another embodiment consistent with the principles of the present invention, user terminal 112_A may support two different connections simultaneously. For example, user terminal 112_A may support both voice and data simultaneously, or alternatively, may support two data connections simultaneous.

In the present embodiment, a calling party may send user terminal 112_A a SMS message. Upon receipt of the SMS message by user terminal 112_A, client software residing on user terminal 112_A may store the SMS message or display it to the user.

Client software residing on user terminal 112_A connects via a HTTP connection provided by user terminal 112_A to digital companion server 406. Alternatively, if the HTTP connection is not available, the software requests that the software platform on user terminal 112_A creates the HTTP connection.

After establishing the connection between the user terminal 112_A, software residing on user terminal 112_A generates a message notification of the SMS message. FIG. 6 shows an exemplary diagram of the type of information generated by the software residing on user terminal 112_A for an SMS message.

User terminal 112_A may send the SMS message and message notification to notification server function 520 of digital companion server 406. Application server function 516 of digital companion server 406 may then determine a preferred device selected by the user.

The information in data structure 600 received by notification server function 520 is stored by database function 522. Application server function 516 may determine the user's preferred device and determine whether the user is logged onto the network. The user may have previously selected one of phone 114, user terminal 112_A, or user terminal 112_B as a preferred device. For example, phone 114 may be a landline or wireless phone, user terminal 112_A may be client software, for example, and user terminal 112_B may include a web browser for web-based viewing of alerts.

Once the user's preferred device is determined, client proxy function 512 may send a SMS message notification to the user's preferred device. The SMS message notification may consist of a text message, for example, indicating a new voice message. The message may include the name and phone number of the calling party and may optionally allow the user to view the SMS message.

In another embodiment consistent with the principles of the present invention, call notifications, voice mail notifications, and SMS message notifications may be stored by database 522, for example, for later retrieval if the user's preferred device is unavailable. For example, if the user is not logged into a desktop client or does not have the preferred device logged onto the network, digital companion server 406 stores the notifications in database function 522.

When the user next logs into the desktop client or the user's preferred device logs onto the network, digital companion server 406 may query database 522 to determine if any notifications have been sent for the user. If notifications are waiting for delivery, then they may be retrieved from database 522 and sent for display on the user's preferred device. Accordingly, the user receives any notifications previously sent while the user was away on a desktop client once the user logs into the system.

Figure 7:
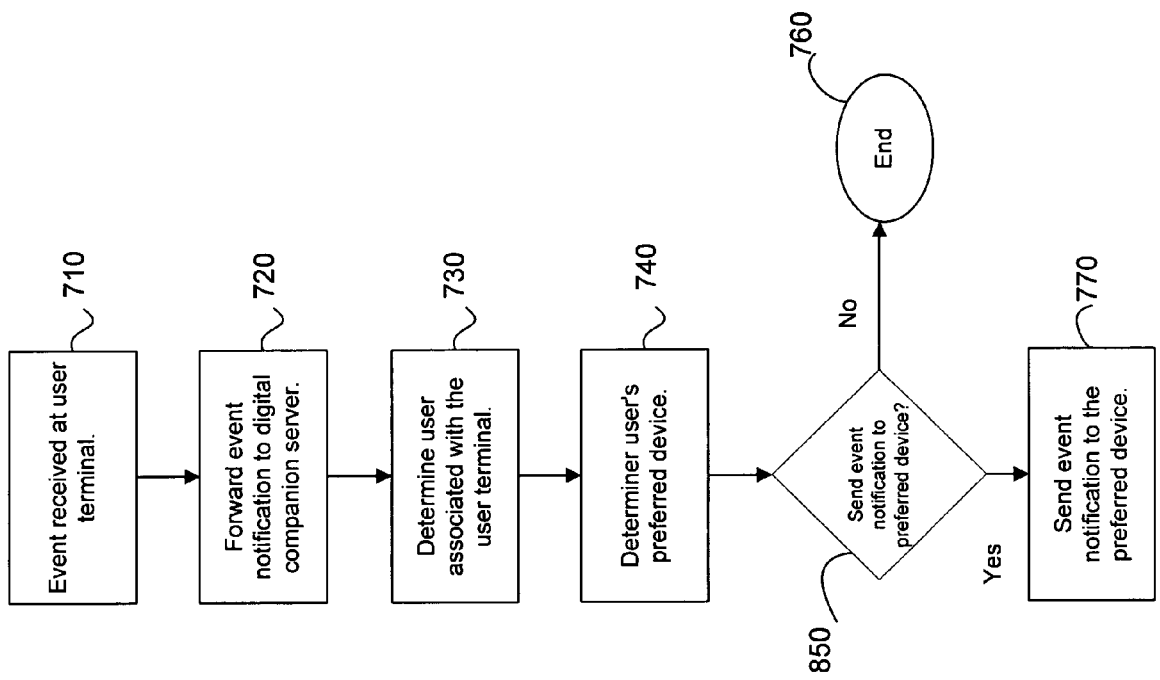
FIG. 7 is a diagram illustrating an overview of event notification for a preferred device.

FIG. 7 is a flow diagram illustrating a method of providing call, voice mail, and SMS message notifications to a user's preferred device consistent with the present invention.

A incoming call, voice mail message, SMS message, or other phone event is received by user terminal 112_A, which is equipped as a software-enabled device (step 710). Software on user terminal 112_A connects to digital companion server 406 and sends a notification of the event to notification server 520 (step 720). Digital companion server 406 may initiate an application server function 516 to determine the user associated with the user terminal (step 730). Application server function 516 may determine the user's preferred device (step 740). Application server function 516 next determines if the user's device is available (step 750).

If the user's preferred device is available, application server function 516 may then route the notification to the user's preferred device via client proxy 512, which connects to the network and sends the notification (step 770). If the user's preferred device is not available, the notification is not sent until the user logs onto the network or the preferred device becomes available (step 760).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing a notification to a preferred communication device of a plurality of communication devices associated with a user, where each of the communication devices can be designated as the preferred communication device, the method comprising:
   receiving, at a server, a notification from one of the communication devices indicating that incoming data has been received at the one communication device, where the incoming data includes an incoming call, a voice mail, or a short message service (SMS) message; and
   transmitting the received notification to the preferred communication device, where transmitting the received notification includes:
      transmitting a first text message to the preferred communication device when the incoming data includes the incoming call,
      transmitting a second text message to the preferred communication device when the incoming data includes the voice mail, the second text message providing a function to play back the voice mail and
      transmitting a third text message to the preferred communication device when the incoming data includes the SMS message, the third text message providing an ability to view the SMS message.

2. The method of claim 1, where transmitting the notification to the preferred communication device comprises storing the notification in a database if the preferred communication device cannot receive the notification.

3. The method of claim 1, further comprising:
   selecting the preferred communication device from among the plurality of communication devices.

4. The method of claim 1, further comprising:
   receiving, at the server, a selection, made by the user, of a time period during which notifications are to be transmitted to the preferred communication device.

5. The method of claim 1, further comprising:
   receiving, at the server, a selection, made by the user, of one or more calling parties from which notifications are to be transmitted to the preferred communication device.

6. The method of claim 5, wherein where receiving the selection is based on a calendar function for providing date specific notifications.

7. The method of claim 1, further comprising:
   receiving, at the server, a selection, made by the user, of the preferred communication device for receiving notifications based on the time of day or a calling party.

8. An apparatus for providing a notification to a preferred communication device of a plurality of communication devices which may be used by a user to initiate and receive communications, the apparatus comprising:
   a server to:
   receive a notification from one of the communication devices indicating that incoming data has been received at the one communication device, where the incoming data includes an incoming call, a voice mail, or a short message service (SMS) message; and
   transmit the notification to the preferred communication device, the notification including an identification of the type of the incoming data, where, when transmitting the notification, the server is further to:
      transmit a first text message to the preferred communication device when the incoming data includes the incoming call;

transmit a second text message to the preferred communication device when the incoming data includes the voice mail, the second text message providing a function to play back the voice mail, and transmit a third text message to the preferred communication device when the incoming data includes the SMS message, the third text message providing an ability to view the SMS message.

9. The apparatus of claim 8, further comprising:

a database to select calling parties from which notifications are to be transmitted to the preferred communication device.

10. The apparatus of claim 9, where the database indicates times during which notifications are to be transmitted to the preferred communication device.

11. The apparatus of claim 8, where the server is further to:

determine if the preferred communication device is available; and transmit the notification when the preferred communication device is available.

12. The apparatus of claim 9, where the database indicates includes information about services to which the user subscribes.

13. The apparatus of claim 8, where the server is further to:

receive a selection, made by the user, of the preferred communication device for receiving notifications based on the time of day or a calling party.

14. The apparatus of claim 8, where the database is further to:

store the notification when the preferred communication device is unavailable.

\* \* \* \* \*